(12) United States Patent
Crouch et al.

(10) Patent No.: US 12,241,978 B2
(45) Date of Patent: *Mar. 4, 2025

(54) METHOD AND SYSTEM FOR ENHANCED VELOCITY RESOLUTION AND SIGNAL TO NOISE RATIO IN OPTICAL PHASE-ENCODED RANGE DETECTION

(71) Applicant: Aurora Operations, Inc., Pittsburgh, PA (US)

(72) Inventors: Stephen C. Crouch, Bozeman, MT (US); Zeb William Barber, Bozeman, MT (US); Emil Kadlec, Bozeman, MT (US); Krishna Rupavatharam, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,821

(22) Filed: May 19, 2023

(65) Prior Publication Data

US 2023/0384447 A1 Nov. 30, 2023

Related U.S. Application Data

(63) Continuation of application No. 17/098,859, filed on Nov. 16, 2020, now Pat. No. 11,709,267, which is a
(Continued)

(51) Int. Cl.
*G01S 17/10* (2020.01)
*G01S 17/32* (2020.01)
(Continued)

(52) U.S. Cl.
CPC ............. *G01S 17/10* (2013.01); *G01S 17/32* (2013.01); *G01S 17/931* (2020.01); *G05D 1/0088* (2013.01)

(58) Field of Classification Search
CPC ........ G01S 17/10; G01S 17/32; G01S 17/931; G05D 1/0088
(Continued)

(56) References Cited

U.S. PATENT DOCUMENTS 7,986,397 B1 7/2011 Tiemann et al.
9,778,362 B2 10/2017 Rondeau et al.
(Continued)

FOREIGN PATENT DOCUMENTS

CA 2842814 8/2014
CA 3179843 A1 * 1/2022 ............ B60W 10/18
(Continued)

OTHER PUBLICATIONS

Chinese Office Action issued in connection with CN Appl. Ser. No. 202080051843.8 dated Oct. 17, 2022.
(Continued)

*Primary Examiner* — Atul Trivedi
(74) *Attorney, Agent, or Firm* — FOLEY & LARDNER LLP

(57) ABSTRACT

An autonomous vehicle control system may include one or more processors configured to receive an electrical signal generated based on a returned optical signal that is reflected from an object. The one or more processors may determine a Doppler frequency shift of the returned optical signal over a first duration of the electrical signal. The one or more processors may generate a corrected electrical signal based on the Doppler frequency shift. The one or more processors may determine a range to the object based on the corrected electrical signal over a second duration that is shorter than the first duration. The one or more processors may control at least one of a steering system or a braking system based on the range.

20 Claims, 25 Drawing Sheets

Related U.S. Application Data continuation of application No. 16/732,167, filed on Dec. 31, 2019, now Pat. No. 10,838,061.

(60) Provisional application No. 62/874,835, filed on Jul. 16, 2019.

(51) Int. Cl.
  *G01S 17/931* (2020.01)
  *G05D 1/00* (2024.01)

(58) Field of Classification Search
  USPC .......................................................... 701/23
  See application file for complete search history.

(56) References Cited

U.S. PATENT DOCUMENTS

| | | | |
|---|---|---|---|
| 9,817,121 | B2 | 11/2017 | Inoue et al. |
| 10,205,457 | B1 | 2/2019 | Josefsberg et al. |
| 10,670,720 | B2 | 6/2020 | Crouch et al. |
| 10,712,431 | B1 | 7/2020 | Angus et al. |
| 10,809,381 | B2 | 10/2020 | Angus |
| 10,838,061 | B1 | 11/2020 | Crouch et al. |
| 10,838,062 | B2 | 11/2020 | De Mersseman et al. |
| 11,041,954 | B2 | 6/2021 | Crouch et al. |
| 11,592,540 | B1* | 2/2023 | Lin .......................... G01S 7/499 |
| 2004/0135992 | A1 | 7/2004 | Munro |
| 2008/0024756 | A1 | 1/2008 | Rogers |
| 2008/0154495 | A1 | 6/2008 | Breed |
| 2008/0161986 | A1 | 7/2008 | Breed |
| 2009/0059201 | A1 | 3/2009 | Willner et al. |
| 2010/0317420 | A1 | 12/2010 | Hoffberg |
| 2014/0104051 | A1* | 4/2014 | Breed ................ G08G 1/09626 340/435 |
| 2015/0185244 | A1 | 7/2015 | Inoue et al. |
| 2016/0029555 | A1* | 2/2016 | Ishii .................... B60L 15/2009 701/22 |
| 2016/0061935 | A1* | 3/2016 | McCloskey ........... G01S 7/4008 342/82 |
| 2017/0187121 | A1 | 6/2017 | Kirino et al. |
| 2017/0277960 | A1* | 9/2017 | Ramasamy .......... G06V 20/588 |
| 2017/0299697 | A1 | 10/2017 | Swanson |
| 2017/0331577 | A1 | 11/2017 | Parkvall et al. |
| 2017/0331670 | A1 | 11/2017 | Parkvall et al. |
| 2017/0343652 | A1* | 11/2017 | de Mersseman ..... G01S 7/4912 |
| 2017/0356983 | A1 | 12/2017 | Jeong et al. |
| 2018/0024246 | A1 | 1/2018 | Jeong et al. |
| 2018/0045819 | A1* | 2/2018 | Cornic .................... G01S 13/34 |
| 2018/0180739 | A1 | 6/2018 | Droz |
| 2018/0206075 | A1* | 7/2018 | Demirdag ............. G01S 13/584 |
| 2018/0224547 | A1 | 8/2018 | Crouch et al. |
| 2018/0284758 | A1 | 10/2018 | Cella et al. |
| 2018/0351261 | A1 | 12/2018 | Kamo et al. |
| 2019/0011558 | A1 | 1/2019 | Crouch et al. |
| 2019/0018115 | A1 | 1/2019 | Schmitt et al. |
| 2019/0020120 | A1 | 1/2019 | Kamo et al. |
| 2019/0056497 | A1 | 2/2019 | Pacala et al. |
| 2019/0072651 | A1 | 3/2019 | Halmos et al. |
| 2019/0080612 | A1* | 3/2019 | Weissman ............. G01S 13/758 |
| 2019/0086517 | A1 | 3/2019 | Puglia et al. |
| 2019/0086518 | A1 | 3/2019 | Hallstig et al. |
| 2019/0094877 | A1* | 3/2019 | Smith .................. B62D 15/024 |
| 2019/0103663 | A1 | 4/2019 | Ichinose et al. |
| 2019/0132709 | A1* | 5/2019 | Graefe ................... G05D 1/028 |
| 2019/0154835 | A1 | 5/2019 | Maleki et al. |
| 2019/0158340 | A1 | 5/2019 | Zhang et al. |
| 2019/0212749 | A1* | 7/2019 | Chen .................. B60W 60/001 |
| 2019/0243371 | A1 | 8/2019 | Nister et al. |
| 2019/0250622 | A1 | 8/2019 | Nister et al. |
| 2019/0288366 | A1 | 9/2019 | Kirino et al. |
| 2019/0317219 | A1 | 10/2019 | Smith et al. |
| 2019/0327124 | A1 | 10/2019 | Lai et al. |
| 2019/0369233 | A1 | 12/2019 | Niesen et al. |
| 2020/0003900 | A1 | 1/2020 | Stochino |
| 2020/0132850 | A1* | 4/2020 | Crouch ................. G01S 17/894 |
| 2020/0166617 | A1* | 5/2020 | Crouch ................... G01S 7/493 |
| 2020/0166647 | A1* | 5/2020 | Crouch ................... G01S 17/26 |
| 2020/0185804 | A1 | 6/2020 | Watanabe et al. |
| 2020/0217935 | A1 | 7/2020 | Angus et al. |
| 2020/0217936 | A1* | 7/2020 | Galloway ............... G01S 17/42 |
| 2020/0278425 | A1 | 9/2020 | Angus et al. |
| 2020/0371212 | A1 | 11/2020 | Rumala |
| 2020/0371213 | A1 | 11/2020 | Rumala |
| 2020/0386875 | A1 | 12/2020 | Crouch et al. |
| 2020/0400821 | A1 | 12/2020 | Baker et al. |
| 2020/0406860 | A1 | 12/2020 | Mai et al. |
| 2021/0025987 | A1 | 1/2021 | Crouch et al. |
| 2021/0109219 | A1 | 4/2021 | Onori et al. |
| 2021/0208272 | A1 | 7/2021 | Lavian et al. |
| 2021/0255290 | A1 | 8/2021 | Crouch et al. |
| 2021/0373172 | A1 | 12/2021 | Solomentsev et al. |
| 2021/0405156 | A1 | 12/2021 | Barber et al. |
| 2022/0043149 | A1 | 2/2022 | Lachapelle |
| 2022/0120900 | A1 | 4/2022 | Fidric et al. |
| 2022/0146676 | A1* | 5/2022 | Armstrong-Crews ....................... G01S 7/4808 |
| 2022/0187458 | A1* | 6/2022 | Piggott .................. G01S 17/36 |
| 2022/0187841 | A1 | 6/2022 | Ebrahimi Afrouzi et al. |
| 2022/0312138 | A1 | 9/2022 | Chebiyyam et al. |
| 2023/0015218 | A1* | 1/2023 | Droz ...................... G01S 7/4917 |
| 2023/0054759 | A1* | 2/2023 | Robinson .............. G01S 17/931 |

FOREIGN PATENT DOCUMENTS

| | | | | |
|---|---|---|---|---|
| CN | 105629258 | A | 6/2016 | |
| CN | 107833490 | A | 3/2018 | |
| CN | 110114632 | A | 8/2019 | |
| CN | 113238246 | A | 8/2021 | |
| CN | 115657070 | A * | 1/2023 | ............. G01S 17/26 |
| EP | 2 963 445 | A2 | 1/2016 | |
| FR | 3061309 | A1 | 6/2018 | |
| KR | 20210090741 | A | 7/2021 | |
| WO | WO-2011/150242 | A1 | 12/2011 | |
| WO | WO-2017/149526 | A2 | 9/2017 | |
| WO | WO-2017/216581 | A1 | 12/2017 | |
| WO | WO-2018/107237 | A1 | 6/2018 | |
| WO | WO-2018125686 | A2 * | 7/2018 | ........... G01S 17/931 |
| WO | WO-2018/160240 | A2 | 9/2018 | |
| WO | WO-2019209727 | A1 * | 10/2019 | ............ B60W 40/02 |
| WO | WO-2021/207429 | A1 | 10/2021 | |
| WO | WO-2021/231903 | A1 | 11/2021 | |

OTHER PUBLICATIONS

Corrected Notice of Allowance on U.S. Appl. No. 16/732,167 dated Sep. 18, 2020 (2 pages).
Final Office Action on U.S. Appl. No. 17/098,859 dtd Dec. 16, 2022.
Foreign Action other than Search Report on CA dtd Feb. 15, 2023.
Foreign Action other than Search Report on CN dtd Apr. 5, 2023.
Foreign Action other than Search Report on PCT PCT/US2020/041809 dtd Jan. 27, 2022.
International Search Report and Written Opinion on Appl. Ser. No. PCT/US2020/041809 dated Oct. 20, 2020 (178 pages).
International Search Report and Written Opinion on Appl. Ser. No. PCT/US2020/041809 dated Jan. 18, 2022 (10 pages).
Non-Final Office Action on U.S. Appl. No. 17/098,859 dtd Aug. 16, 2022.
Non-Final Office Action on U.S. Appl. No. 16/732,167 dated Mar. 23, 2020 (5 pages).
Notice of Allowance on U.S. Appl. No. 17/098,859 dtd Mar. 8, 2023.
Notice of Allowance on U.S. Appl. No. 16/732,167 dated Jul. 8, 2020 (9 pages).
Office Action issued in connection with Chinese Appl. No. 202311278493.0 dated Nov. 26, 2024.

\* cited by examiner

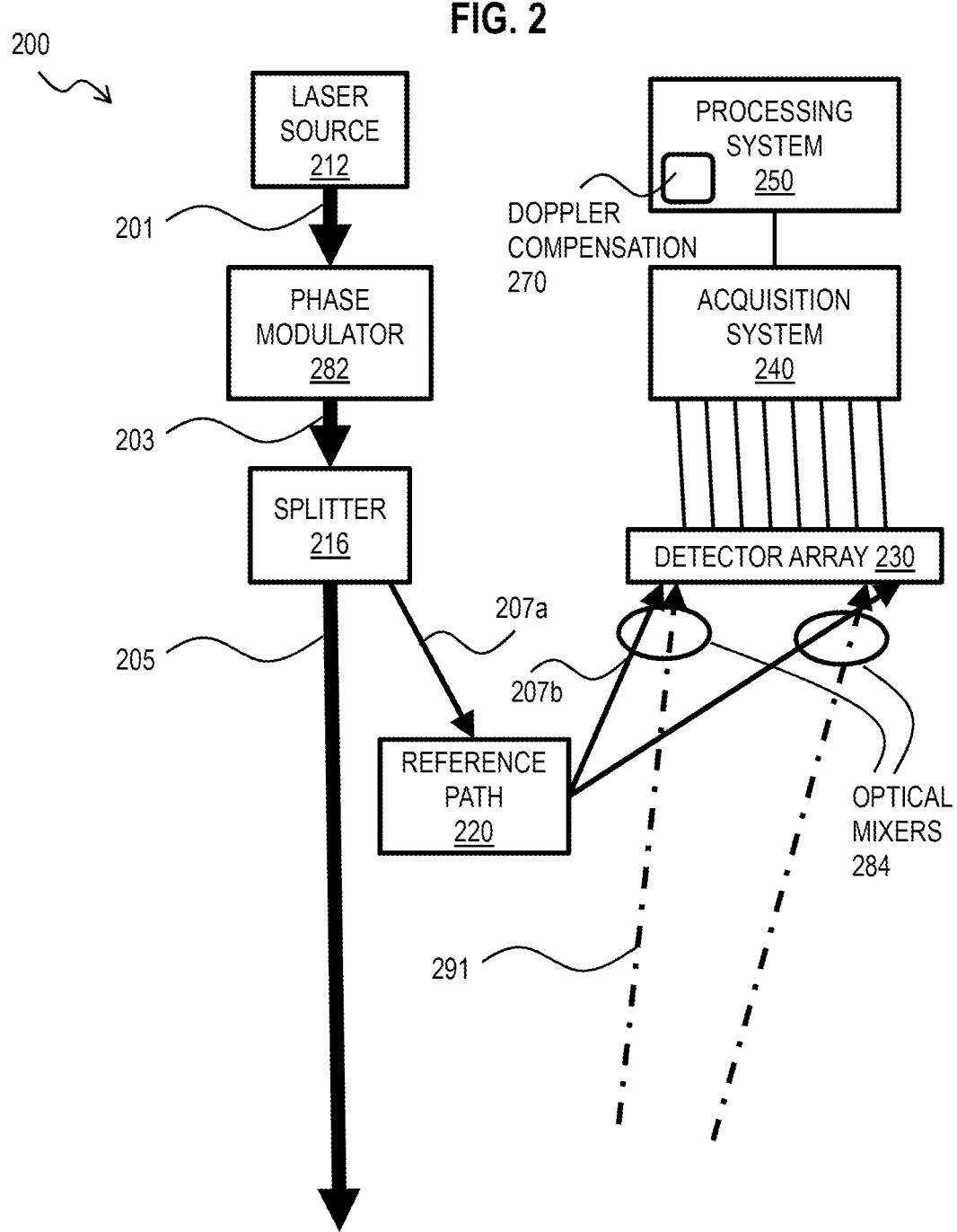

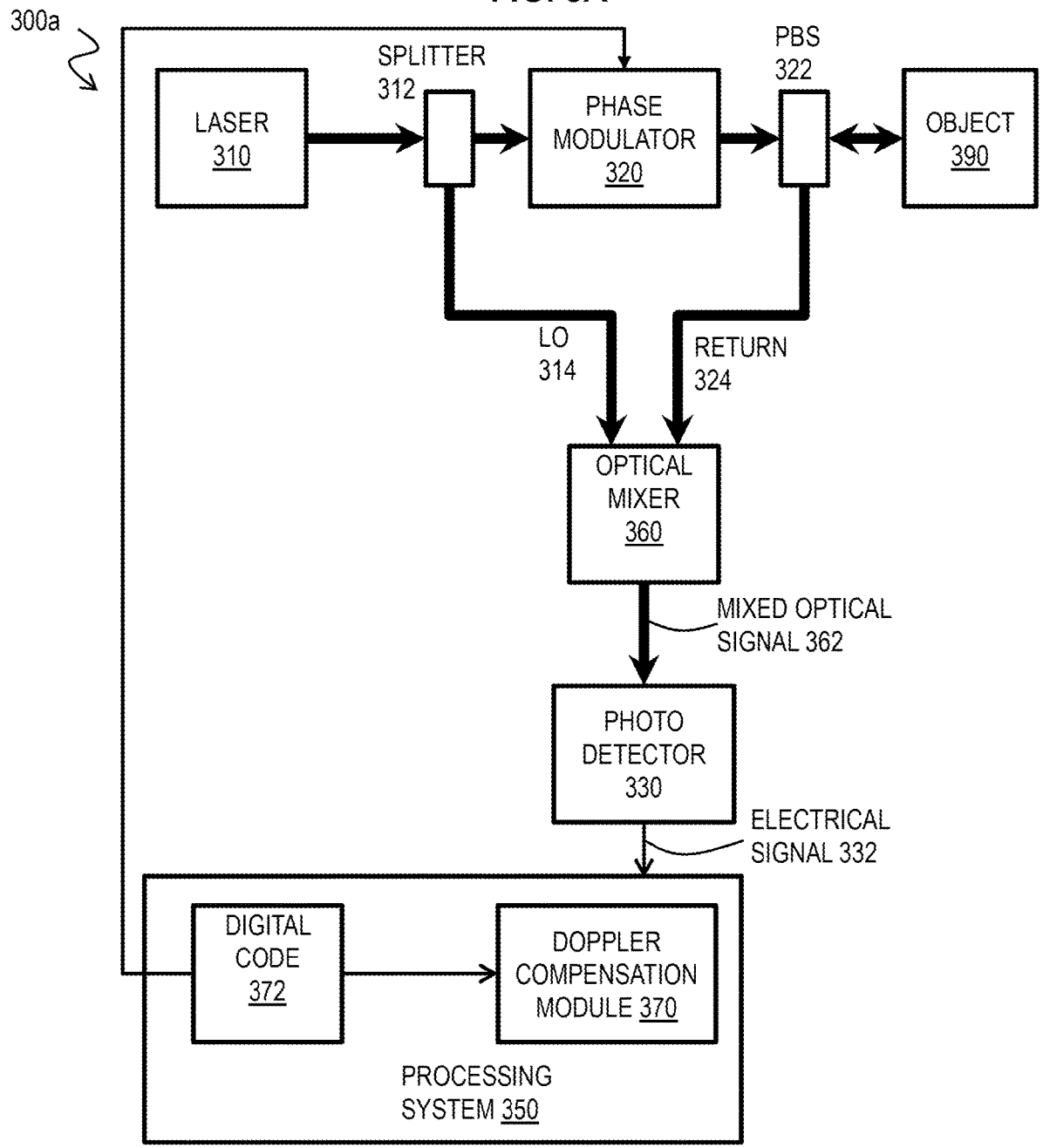

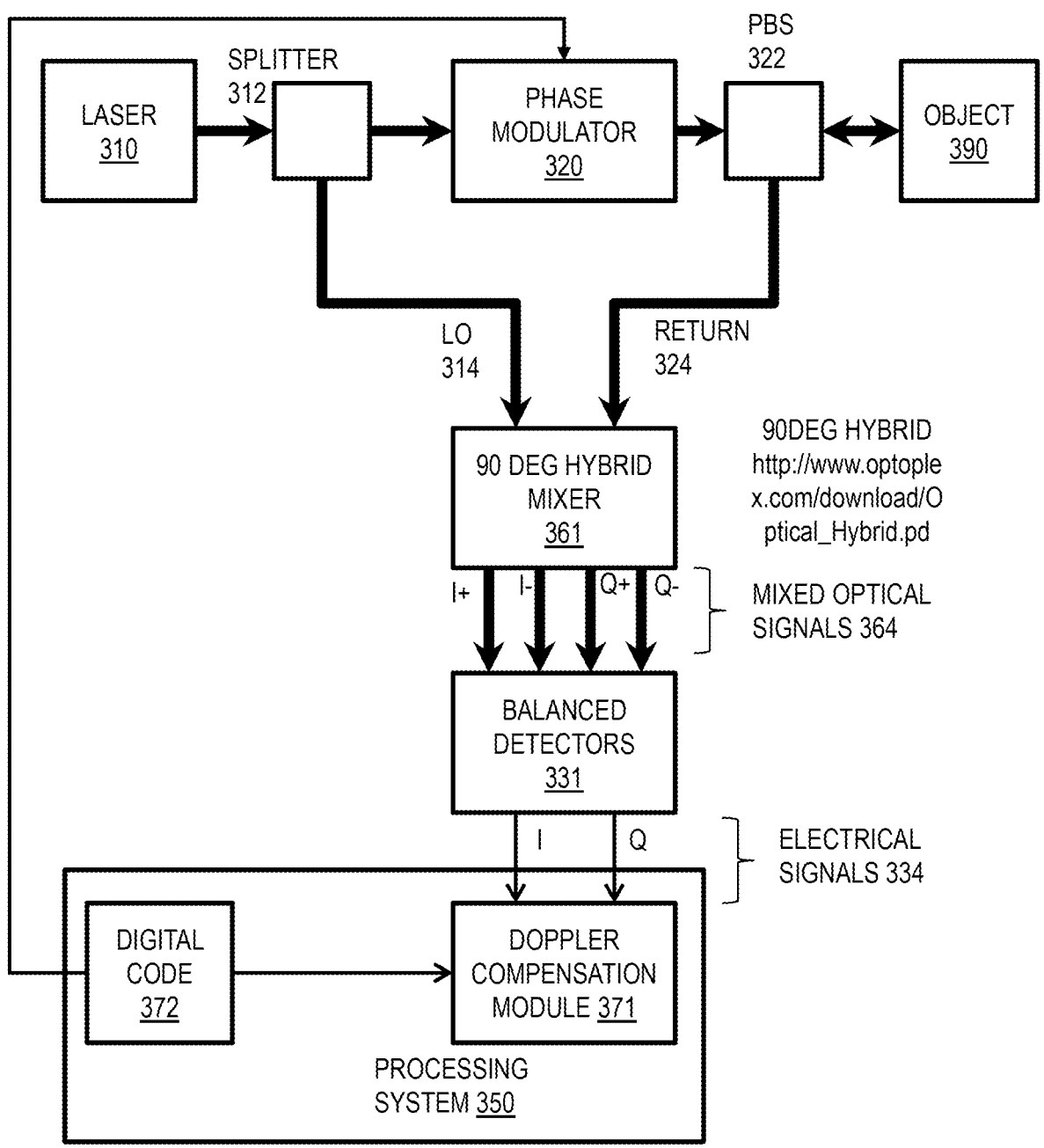

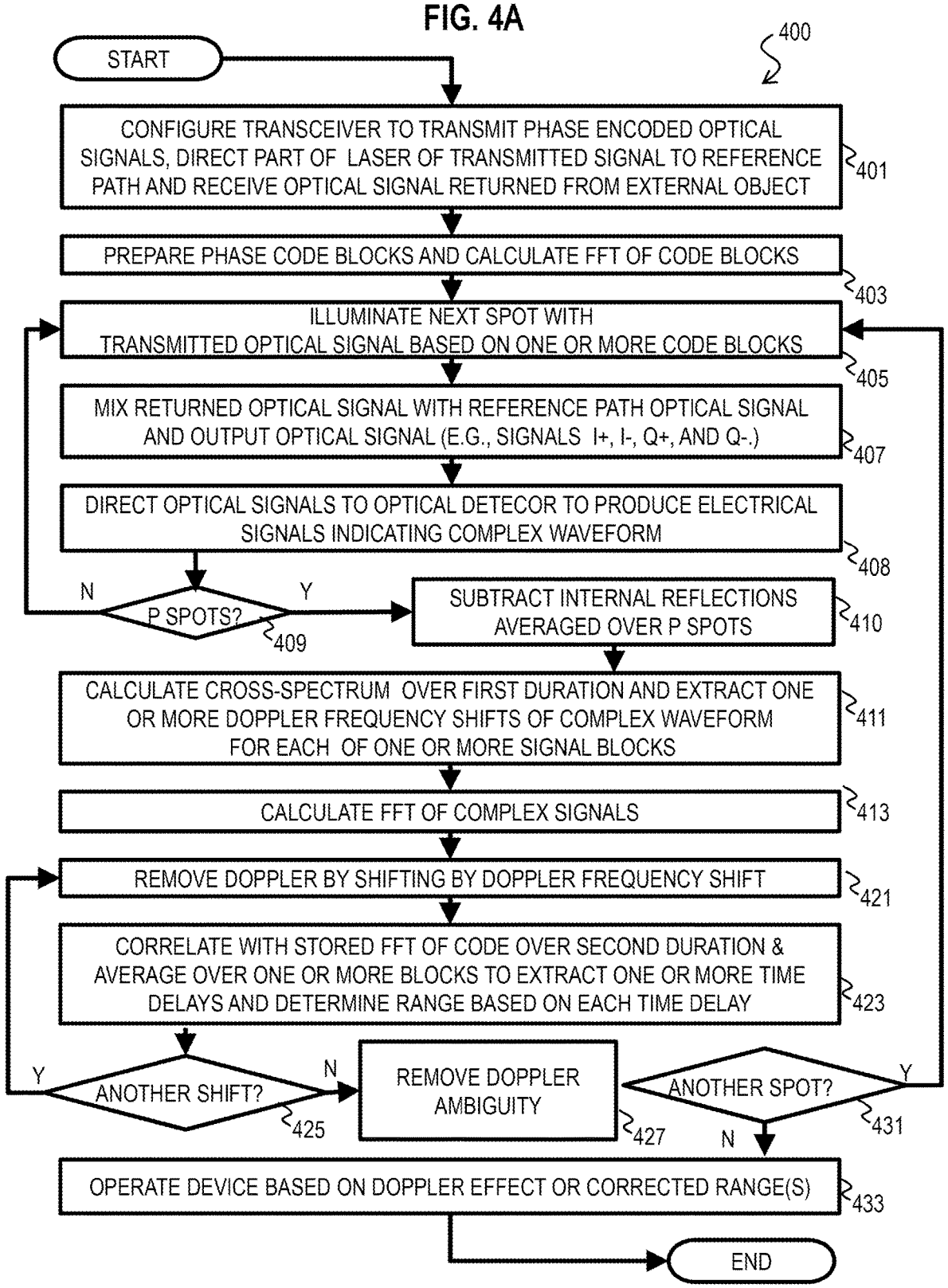

METHOD AND SYSTEM FOR ENHANCED VELOCITY RESOLUTION AND SIGNAL TO NOISE RATIO IN OPTICAL PHASE-ENCODED RANGE DETECTION

CROSS-REFERENCE TO RELATED APPLICATIONS

This application is a Continuation of U.S. patent application Ser. No. 17/098,859, filed Nov. 16, 2020, which is a Continuation of U.S. patent application Ser. No. 16/732,167, filed Dec. 31, 2019, which claims the benefit of and priority to U.S. Provisional Patent Application No. 62/874,835, filed Jul. 16, 2019. The entire disclosures of U.S. patent application Ser. No. 17/098,859, U.S. patent application Ser. No. 16/732,167, and U.S. Provisional Patent Application No. 62/874,835 are incorporated herein by reference.

BACKGROUND

Optical detection of range using lasers, often referenced by a mnemonic, LIDAR, for light detection and ranging, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

SUMMARY

Aspects of the present disclosure relate generally to light detection and ranging (LIDAR) in the field of optic, and more particularly to systems and methods for enhanced velocity resolution and signal to noise ratio in optical phase-encoded range detection.

One implementation disclosed herein in directed to a system for enhanced velocity resolution and signal to noise ratio in optical phase-encoded range detection. In some implementations, the system includes receiving an electrical signal generated by mixing a first optical signal and a second optical signal, wherein the first optical signal is generated by modulating an optical signal and wherein the second optical signal is received in response to transmitting the first optical signal toward an object. In some implementations, the system includes determining a Doppler frequency shift of the second optical signal. In some implementations, the system includes generating a corrected electrical signal by adjusting the electrical signal based on the Doppler frequency shift. In some implementations, the system includes determining a range to the object based on a cross correlation associated with the corrected electrical signal.

In another aspect, the present disclosure is directed to a light detection and ranging (LIDAR) system for enhanced velocity resolution and signal to noise ratio in optical phase-encoded range detection. In some implementations, the LIDAR system includes one or more processors; and one or more computer-readable storage mediums storing instructions which, when executed by the one or more processors, cause the one or more processors to receive an electrical signal generated by mixing a first optical signal and a second optical signal, wherein the first optical signal is generated by phase-modulating an optical signal and wherein the second optical signal is received in response to transmitting the first optical signal toward an object. In some implementations, the LIDAR system includes one or more processors; and one or more computer-readable storage mediums storing instructions which, when executed by the one or more processors, cause the one or more processors to determine a spectrum over a first duration of the electrical signal. In some implementations, the LIDAR system includes one or more processors; and one or more computer-readable storage mediums storing instructions which, when executed by the one or more processors, cause the one or more processors to determine a Doppler frequency shift of the second optical signal based on the spectrum. In some implementations, the LIDAR system includes one or more processors; and one or more computer-readable storage mediums storing instructions which, when executed by the one or more processors, cause the one or more processors to generate a corrected electrical signal by adjusting the electrical signal based on the Doppler frequency shift. In some implementations, the LIDAR system includes one or more processors; and one or more computer-readable storage mediums storing instructions which, when executed by the one or more processors, cause the one or more processors to determine a range to the object based on a cross correlation over the first duration of the corrected electrical signal and a second duration of a phase-encoded radio frequency (RF) signal associated with the first optical signal, the first duration is different from the second duration.

In another aspect, the present disclosure is directed to an autonomous vehicle that includes a light detection and ranging (LIDAR) system. In some implementations, the LIDAR system includes one or more processors; and one or more computer-readable storage mediums storing instructions which, when executed by the one or more processors, cause the one or more processors to receive an electrical signal generated by mixing a first optical signal and a second optical signal, wherein the first optical signal is generated by modulating an optical signal and wherein the second optical signal is received in response to transmitting the first optical signal toward an object. In some implementations, the LIDAR system includes one or more processors; and one or more computer-readable storage mediums storing instructions which, when executed by the one or more processors, cause the one or more processors to determine a Doppler frequency shift of the second optical signal. In some implementations, the LIDAR system includes one or more processors; and one or more computer-readable storage mediums storing instructions which, when executed by the one or more processors, cause the one or more processors to generate a corrected electrical signal by adjusting the electrical signal based on the Doppler frequency shift. In some implementations, the LIDAR system includes one or more processors; and one or more computer-readable storage mediums storing instructions which, when executed by the one or more processors, cause the one or more processors to determine a range to the object based on a cross correlation of the corrected electrical signal with a radio frequency (RF) signal that is associated with the first optical signal. In some implementations, the LIDAR system includes one or more processors; and one or more computer-readable storage mediums storing instructions which, when executed by the one or more processors, cause the one or more processors to operate the autonomous vehicle based on the range to the object.

Still other aspects, features, and advantages are readily apparent from the following detailed description, simply by illustrating a number of particular implementations, including the best mode contemplated for carrying out the implementations of the disclosure. Other implementations are also capable of other and different features and advantages, and its several details can be modified in various obvious respects, all without departing from the spirit and scope of the implementation. Accordingly, the drawings and description are to be regarded as illustrative in nature, and not as restrictive.

BRIEF DESCRIPTION OF THE DRAWINGS

Implementations are illustrated by way of example, and not by way of limitation, in the figures of the accompanying drawings in which like reference numerals refer to similar elements and in which:

FIG. 2 is a block diagram that illustrates example components of a high resolution LIDAR system, according to an implementation;

FIG. 3A is a block diagram that illustrates example components of a phase-encoded LIDAR system, according to an implementation;

FIG. 3B is a block diagram that illustrates example components of a Doppler compensated phase-encoded LIDAR system, according to an implementation;

FIG. 4A is a flow chart that illustrates an example method for using Doppler-corrected phase-encoded LIDAR system to determine and compensate for Doppler effects on ranges, according to an implementation;

DETAILED DESCRIPTION

Figure 1A:
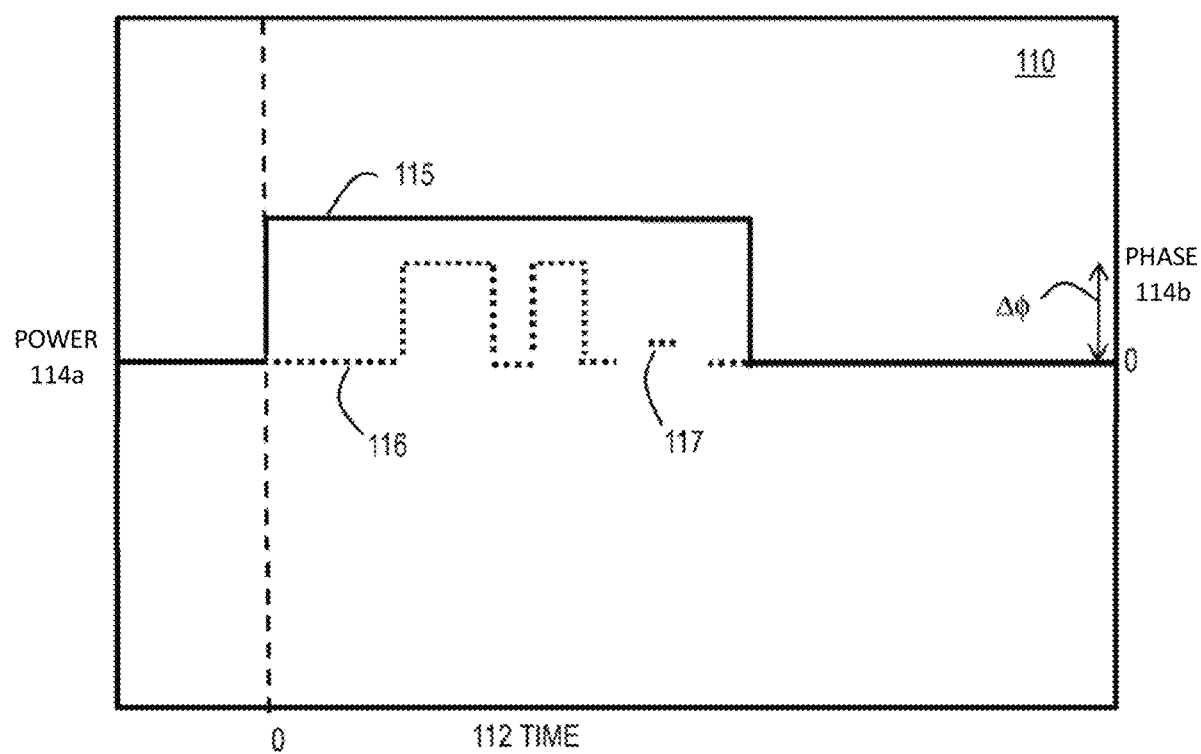
FIG. 1A is a schematic graph that illustrates an example transmitted optical phase-encoded signal for measurement of range, according to an implementation.

To achieve acceptable range accuracy and detection sensitivity, direct long-range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length of the phase codes rather than the pulse duration, and therefore excellent range accuracy can still be obtained.

Useful optical chirp bandwidths have been achieved using wideband radio frequency (RF) electrical signals to modulate an optical carrier. Recent advances in chirped LIDAR include using the same modulated optical carrier as a reference signal that is combined with the returned signal at an optical detector to produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability. Recent work described in U.S. Pat. No. 7,742,152, the entire contents of which are hereby incorporated by reference as if fully set forth herein, except for terminology that is inconsistent with the terminology used herein, show a novel simpler arrangement of optical components that uses, as the reference optical signal, an optical signal split from the transmitted optical signal. This arrangement is called homodyne detection in that patent.

LIDAR detection with phase-encoded microwave signals modulated onto an optical carrier have been used as well. Here bandwidth B is proportional to the inverse of the duration—$\tau$ of the pulse that carries each phase (B=1/$\tau$), with any phase-encoded signal made up of a large number of such pulses. This technique relies on correlating a sequence of phases (or phase changes) of a particular frequency in a return signal with that in the transmitted signal. A time delay associated with a peak in correlation is related to range by the speed of light in the medium. Range resolution is proportional to the pulse width—$\tau$. Advantages of this technique include the need for fewer components, and the use of mass-produced hardware components developed for phase-encoded microwave and optical communications.

However, phase-encoded LIDAR systems implementing the aforementioned approaches to signed Doppler detection often struggle with providing a target velocity resolution that is suitable for autonomous vehicle (AV) applications.

Accordingly, the present disclosure is directed to systems and methods for enhancing the performance of LIDAR. That is, the present disclosure describes a LIDAR system having a synchronous processing arrangement where the transmitted and reference optical signals are generated from the same carrier, thereby resulting in a correlation of the phases of the Doppler frequency shift signal and the range signal. This provides noticeable advantages in compensation of multiple Doppler signals from a single target, elimination of range signal from consideration due to inconsistent phases, and determining the sign of Doppler velocity from real values signals as a sign shift of this correlated phase.

Furthermore, the present disclosure describes a LIDAR system having an asynchronous processing arrangement. That is, the conventional LIDAR systems feature a synchronous processing arrangement where the Doppler frequency shift (to calculate target velocity) and the time delay (to calculate target range) are measured over the same coherent processing interval (CPI). The current inventors, however, recognized that this synchronous processing arrangement is arbitrary and that an asynchronous processing arrangement can be designed where the Doppler frequency shift and time delay are measured over different CPI. The current inventors recognized that such an asynchronous processing arrangement provides noticeable advantages, such as improved target velocity resolution where the CPI for measuring the Doppler frequency shift is longer than the CPI for measuring the time delay.

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

1. Phase-Encoded Detection Overview

FIG. 1A is a schematic graph 110 that illustrates an example transmitted optical phase-encoded signal for measurement of range, according to an implementation. The horizontal axis 112 indicates time in arbitrary units from a start time at zero. The left vertical axis 114a indicates power in arbitrary units during a transmitted signal; and, the right vertical axis 114b indicates phase of the transmitted signal in arbitrary units. To most simply illustrate the technology of phase-encoded LIDAR, binary phase encoding is demonstrated. Trace 115 indicates the power relative to the left axis 114a and is constant during the transmitted signal and falls to zero outside the transmitted signal. Dotted trace 116 indicates phase of the signal relative to a continuous wave signal.

As can be seen, the trace is in phase with a carrier (phase=0) for part of the transmitted signal and then changes by $\Delta\phi$ (phase=$\Delta\phi$) for short time intervals, switching back and forth between the two phase values repeatedly over the transmitted signal as indicated by the ellipsis 117. The shortest interval of constant phase is a parameter of the encoding called pulse duration—$\tau$ and is typically the duration of several periods of the lowest frequency in the band. The reciprocal, 1/$\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\phi^*$ {0, 1, 2 and 3}, which, for $\Delta\phi=\pi/2$ (90 degrees), equals {0, $\pi/2$, $\pi$ and $3\pi/2$}, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave) as illustrated in FIG. 1A. The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement than ordinary PSK, since there is no need for the demodulator to have a copy of the reference signal to determine the exact phase of the received signal (it is a non-coherent scheme).

For optical ranging applications, the carrier frequency is an optical frequency fc and a RF $f_0$ is modulated onto the optical carrier. The number N and duration—$\tau$ of symbols are selected to achieve the desired range accuracy and resolution. The pattern of symbols is selected to be distinguishable from other sources of coded signals and noise. Thus a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

Figure 1B:
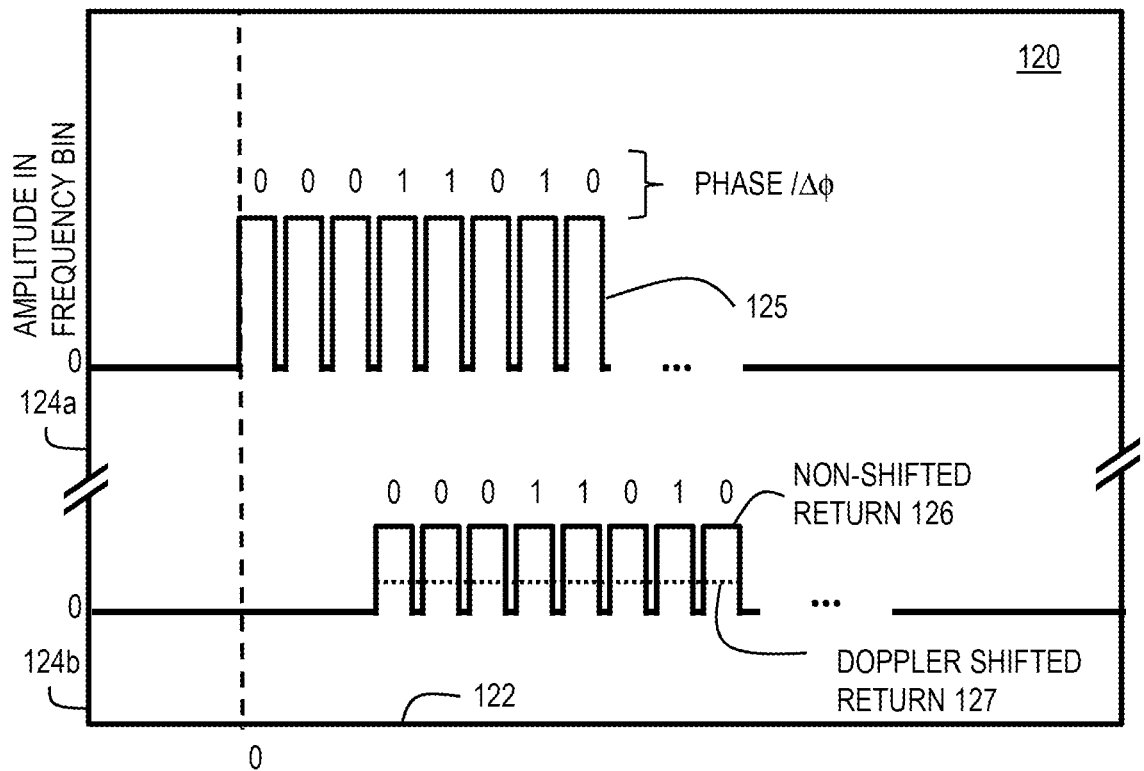
FIG. 1B is a schematic graph that illustrates the example transmitted signal of FIG. 1A as a series of binary digits along with returned optical signals for measurement of range, according to an implementation.

FIG. 1B is a schematic graph 120 that illustrates the example transmitted signal of FIG. 1A as a series of binary digits along with returned optical signals for measurement of range, according to an implementation. The horizontal axis 122 indicates time in arbitrary units after a start time at zero. The vertical axis 124a indicates amplitude of an optical transmitted signal at frequency fc+f$_0$ in arbitrary units relative to zero. The vertical axis 124b indicates amplitude of an optical returned signal at frequency fc+f$_0$ in arbitrary units relative to zero, and is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency fc+f$_0$ and is not well detected in the expected frequency band, so the amplitude is diminished.

The observed frequency f' of the return differs from the correct frequency f=fc+f$_0$ of the return by the Doppler effect given by Equation 1.

$$f' = \frac{(c+v_o)}{(c+v_s)}f \qquad (1)$$

Where c is the speed of light in the medium. Note that the two frequencies are the same if the observer and source are moving at the same speed in the same direction on the vector between the two. The difference between the two frequencies, $\Delta f = f' - f$, is the Doppler shift, $\Delta f_D$, which causes problems for the range measurement, and is given by Equation 2.

$$\Delta f_D = \left[\frac{(c+v_o)}{(c+v_s)} - 1\right]f \qquad (2)$$

Note that the magnitude of the error increases with the frequency f of the signal. Note also that for a stationary LIDAR system (v$_o$=0), for an object moving at 10 meters a second (v$_o$=10), and visible light of frequency about 500 THz, then the size of the error is on the order of 16 megahertz (MHz, 1 MHz=10$^6$ hertz, Hz, 1 Hz=1 cycle per second). In various implementations described below, the Doppler shift error is detected and used to process the data for the calculation of range.

Figure 1C:
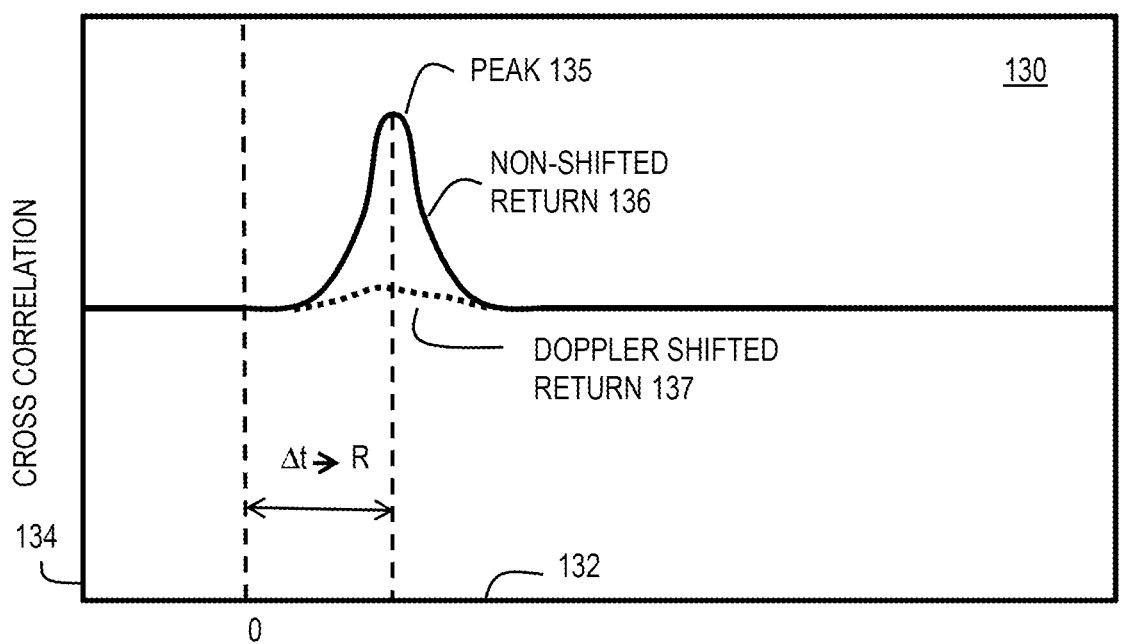
FIG. 1C is a schematic graph that illustrates example cross-correlations of a reference signal with two returned signals, according to an implementation.

FIG. 1C is a schematic graph 130 that illustrates example cross-correlations of the transmitted signal with two returned signals, according to an implementation. In phase coded ranging, the arrival of the phase coded reflection is detected in the return by cross correlating the transmitted signal or other reference signal with the returned signal, implemented practically by cross correlating the code for an RF signal with an electrical signal from an optical detector using heterodyne detection and thus down-mixing back to the RF band. The horizontal axis 132 indicates a lag time in arbitrary units applied to the coded signal before performing the cross correlation calculation with the returned signal. The vertical axis 134 indicates amplitude of the cross correlation computation. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each the two traces followed by an inverse Fourier transform. Efficient hardware and software implementations for a Fast Fourier transform (FFT) are widely available for both forward and inverse Fourier transforms. More precise mathematical expression for performing the cross correlation are provided for some example implementations, below.

Note that the cross correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

Trace 136 represents cross correlation with an idealized (noiseless) return signal that is reflected from an object that is not moving (and thus the return is not Doppler shifted). A peak occurs at a time $\Delta t$ after the start of the transmitted signal. This indicates that the returned signal includes a version of the transmitted phase code beginning at the time $\Delta t$. The range (distance) L to the reflecting (or backscattering) object is computed from the two way travel time delay based on the speed of light c in the medium, as given by Equation 3.

$$L = c*\Delta t/2 \qquad (3)$$

Dotted trace 137 represents cross correlation with an idealized (noiseless) return signal that is scattered from an object that is moving (and thus the return is Doppler shifted). The return signal does not include the phase encoding in the proper frequency bin, the correlation stays low for all time lags, and a peak is not as readily detected. Thus $\Delta t$ is not as readily determined and range L is not as readily produced.

Figure 1D:
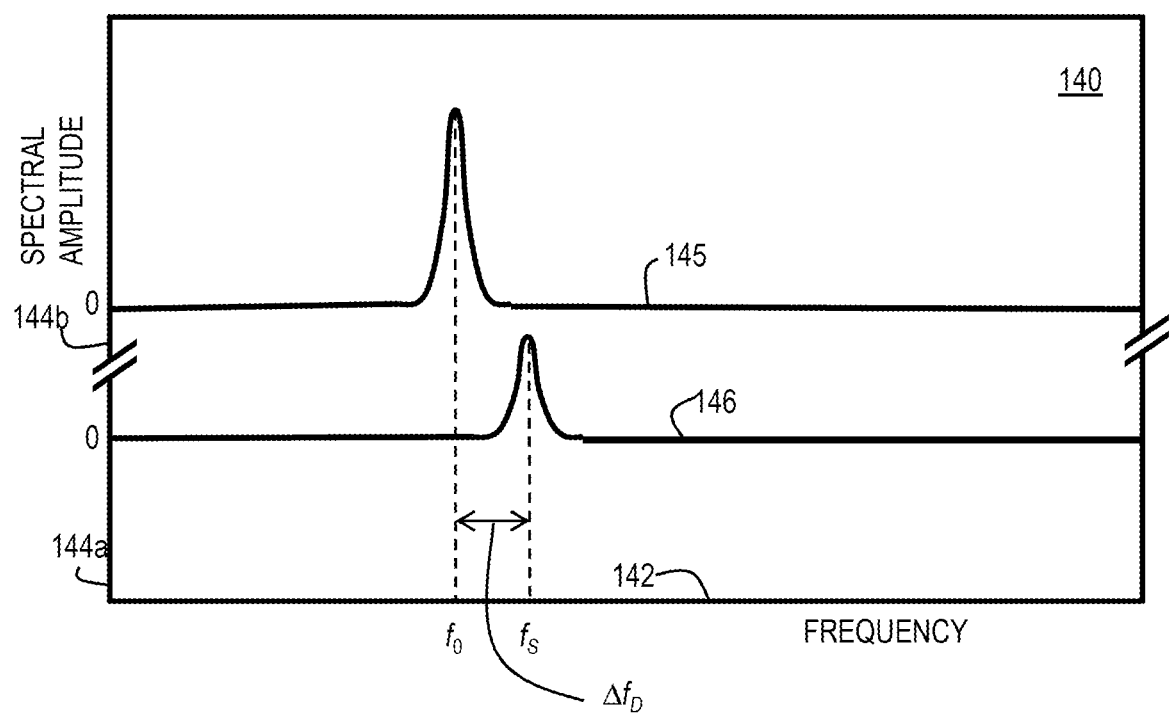
FIG. 1D is a schematic graph that illustrates an example spectrum of the reference signal and an example spectrum of a Doppler shifted return signal, according to an implementation.

According to various implementations described in more detail below, the Doppler shift is determined in the electrical processing of the returned signal; and the Doppler shift is used to correct the cross correlation calculation. Thus a peak is more readily found and range can be more readily determined. FIG. 1D is a schematic graph 140 that illustrates an example spectrum of the transmitted signal and an example spectrum of a Doppler shifted return signal, according to an implementation. The horizontal axis 142 indicates RF frequency offset from an optical carrier fc in arbitrary units. The vertical axis 144a indicates amplitude of a particular narrow frequency bin, also called spectral density, in arbitrary units relative to zero. The vertical axis 144b indicates spectral density in arbitrary units relative to zero, and is offset from axis 144a to separate traces. Trace 145 represents a transmitted signal; and, a peak occurs at the proper RF f$_0$. Trace 146 represents an idealized (noiseless) return signal that is backscatter from an object that is moving and is therefore Doppler shifted. The return does not have a peak at the proper RF f$_0$; but, instead, is blue shifted by $\Delta f_D$ to a shifted frequency f$_S$.

Figure 1E:
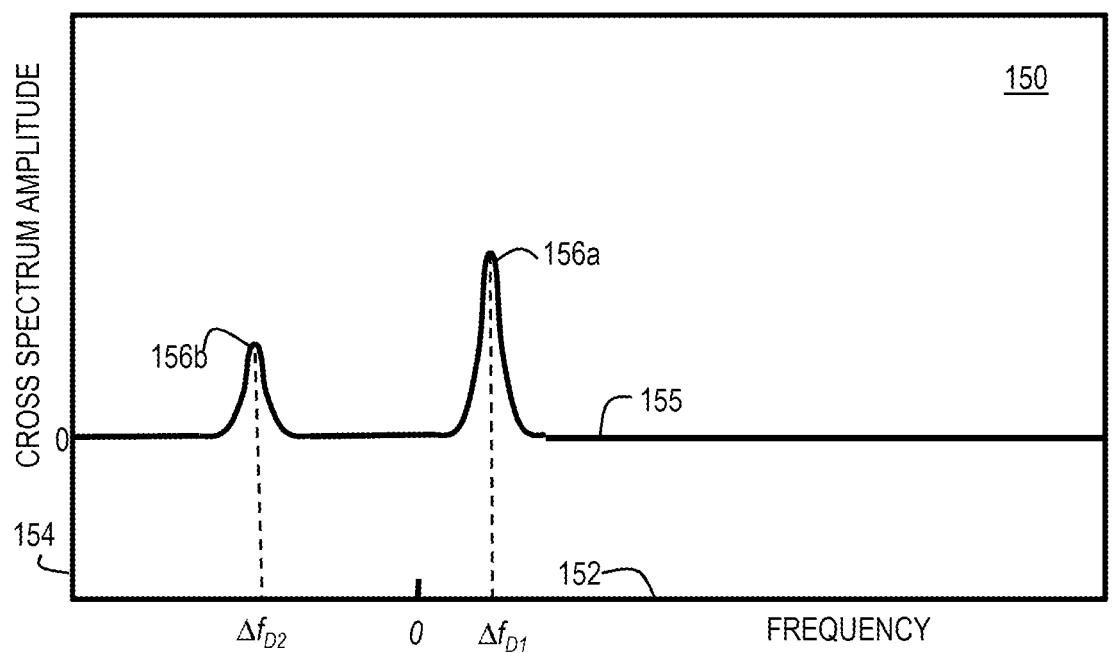
FIG. 1E is a schematic graph that illustrates an example cross-spectrum of phase components of a Doppler shifted return signal, according to an implementation.

In some Doppler compensation implementations, rather than finding $\Delta f_D$ by taking the spectrum of both transmitted and returned signals and searching for peaks in each, then subtracting the frequencies of corresponding peaks, as illustrated in FIG. 1D, it is more efficient to take the cross spectrum of the in-phase and quadrature component of the down-mixed returned signal in the RF band. FIG. 1E is a schematic graph 150 that illustrates an example cross-spectrum, according to an implementation. The horizontal axis 152 indicates frequency shift in arbitrary units relative to the reference spectrum; and, the vertical axis 154 indicates amplitude of the cross spectrum in arbitrary units relative to zero. Trace 155 represents a cross spectrum with an idealized (noiseless) return signal generated by one object moving toward the LIDAR system (blue shift of $\Delta f_{D1} = \Delta f_D$ in FIG. 1D) and a second object moving away from the LIDAR system (red shift of $\Delta f_{D2}$). A peak occurs when one of the components is blue shifted $\Delta f_{D1}$; and, another peak occurs when one of the components is red shifted $\Delta f_{D2}$. Thus the Doppler shifts are determined. These shifts can be used to determine a velocity of approach of objects in the vicinity of the LIDAR, as can be critical for collision avoidance applications.

As described in more detail below, the Doppler shift(s) detected in the cross spectrum are used to correct the cross correlation so that the peak 135 is apparent in the Doppler compensated Doppler shifted return at lag $\Delta t$, and range L can be determined. The information needed to determine and compensate for Doppler shifts is either not collected or not used in prior phase-encoded LIDAR systems.

2. Optical Detection Hardware Overview

In order to depict how a phase-encoded detection approach is implemented, some generic and specific hardware approaches are described. FIG. 2 is a block diagram that illustrates example components of a high resolution LIDAR system, according to an implementation. A laser source 212 emits a carrier wave 201 that is phase modulated in phase modulator 282 to produce a phase coded optical signal 203 that has a symbol length M*N and a duration D=M*N*τ. A splitter 216 splits the optical signal into a target beam 205, also called transmitted signal herein, with most of the energy of the beam 203 and a reference beam 207a with a much smaller amount of energy that is nonetheless enough to produce good mixing with the returned light 291 scattered from an object (not shown). In some implementations, the splitter 216 is placed upstream of the phase modulator 282. The reference beam 207a passes through reference path 220 and is directed to one or more detectors as reference beam 207b. In some implementations, the reference path 220 introduces a known delay sufficient for reference beam 207b to arrive at the detector array 230 with the scattered light. In some implementations the reference beam 207b is called the local oscillator (LO) signal referring to older approaches that produced the reference beam 207b locally from a separate oscillator. In various implementations, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2, with or without a path length adjustment to compensate for the phase difference observed or expected for a particular range; or, 3) using a frequency shifting device (acousto-optic modulator) or time delay of a local oscillator waveform modulation to produce a separate modulation to compensate for path length mismatch; or some combination. In some implementations, the object is close enough and the transmitted duration long enough that the returns sufficiently overlap the reference signal without a delay.

The detector array is a single paired or unpaired detector or a 1 dimensional (1D) or 2 dimensional (2D) array of paired or unpaired detectors arranged in a plane roughly perpendicular to returned beams 291 from the object. The reference beam 207b and returned beam 291 are combined in zero or more optical mixers to produce an optical signal of characteristics to be properly detected. The phase or amplitude of the interference pattern, or some combination, is recorded by acquisition system 240 for each detector at multiple times during the signal duration D. The number of temporal samples per signal duration affects the down-range extent. The number is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the unique code before it repeats (for unambiguous ranging). This is enabled as any digital record of the returned bits could be cross correlated with any portion of transmitted bits from the prior transmission history. The acquired data is made available to a processing system 250, such as a computer system described below with reference to FIG. 12, or a chip set described below with reference to FIG. 13. A Doppler compensation module 270 determines the size of the Doppler shift and the corrected range based thereon along with any other corrections described herein. Any known apparatus or system may be used to implement the laser source 212, phase modulator 282, beam splitter 216, reference path 220, optical mixers 284, detector array 230, or acquisition system 240. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

3. Phase-Encoded Optical Detection

In some implementations, electro-optic modulators provide the modulation. The system is configured to produce a phase code of length M*N and symbol duration —τ, suitable for the down-range resolution desired, as described in more detail below for various implementations. In an implementation, the phase code includes a plurality of M blocks, where each block has a duration or phase code duration of N*τ. For example, in 3D imaging applications, the total number of pulses M*N is in a range from about 500 to about 4000. Because the processing is done in the digital domain, it is advantageous to select M*N as a power of 2, e.g., in an interval from 512 to 4096. M is 1 when no averaging is done. If there are random noise contributions, then it is advantages for M to be about 10. As a result, N is in a range from 512 to 4096 for M=1 and in a range from about 50 to about 400 for M=10. For a 500 Mbps to 1 Gbps baud rate, the duration of these codes is then between about 500 ns and 8 microseconds. It is noted that the range window can be made to extend to several kilometers under these conditions and that the Doppler resolution can also be quite high (depending on the duration of the transmitted signal). Although processes, equipment, and data structures are depicted in FIG. 2 as integral blocks in a particular arrangement for purposes of illustration, in other implementations one or more processes or data structures, or portions thereof, are arranged in a different manner, on the same or different hosts, in one or more databases, or are omitted, or one or more different processes or data structures are included on the same or different hosts. For example splitter 216 and reference path 220 include zero or more optical couplers.

3.1 Doppler Compensated LIDAR

FIG. 3A is a block diagram that illustrates example components of a phase-encoded LIDAR system 300a. Although an object 390 is depicted to illustrate operation of the system 300a, the object 390 is not part of the system 300a. The system includes laser source 310, beam splitter 312, phase modulator 320, polarizing beam splitter 322, optical mixer 360, photodetector 330 (also referred to herein as, "optical detector 330"), and processing system 350, the latter including a digital code module 372 and Doppler compensation module 370. Optical signals are represented by thick arrows and electrical signals by thin arrows.

In electrical engineering, a sinusoid with phase modulation (corresponding to an angle modulation between the real and imaginary parts of the mathematical function exp(iωt) can be decomposed into, or synthesized from, two amplitude-modulated sinusoids that are offset in phase by one-quarter cycle ($\pi/2$ radians). All three functions have the same frequency. The amplitude modulated sinusoids are known as in-phase component (I) at 0 phase and quadrature component (Q) at a phase of $\pi/2$. A laser 310 produces an optical signal at a carrier frequency fc. The laser optical signal, L, is represented mathematically by Equation 4.

$$L = I_0 \exp(i\omega t) \tag{4}$$

where $I_0$ is the intensity output by the laser, exp( ) is the exponential function such that $\exp(x) = e^x$, i is the imaginary number having the properties of the square root of $-1$, t is time, and $\omega = 2\pi fc$ is the angular frequency corresponding to the optical carrier frequency fc. Mathematically this expression has a real part=$I_{0R} \cos(\omega t)$ and an imaginary part=$I_{0I} \sin(\omega t)$, where $I_{0R}$ is the real part of the intensity (in-phase) and $I_{0I}$ is the imaginary part. The phase of the oscillation is given by the angle between the real and imaginary parts. Thus, $L = I_{0R} \cos(\omega t) + i\, I_{0I} \sin(\omega t)$, and $I_0$ is the root of the sum of the squares of the real and imaginary parts, $I_0^2 = I_{0R}^2 + I_{0I}^2$. Splitter 312 directs a small portion of the intensity of the signal to use as a reference signal (called a local oscillator) LO given by Equation 5.

$$LO = A_{LO} \exp(i\omega t) = A_R \cos(\omega t) + i\, A_I \sin(\omega t). \tag{5a}$$

where A is a constant that represents the intensity effect of the splitter 312. The electric field, $E_{LO}$, can thus be written as Equation 5b.

$$E_{LO} = A_{LO} e^{i\omega t} \tag{5b}$$

When the reference signal (LO) is the unmodulated laser signal, the entire signal is in phase and the imaginary component is zero, thus $$LO = A \cos(\omega t). \tag{5c}$$

The digital code module 372 in the processing system 350 sends an electrical signal that indicates a digital code of symbols to be imposed as phase changes on the optical carrier, represented as B(t) where B(t) switches between 0 and □/2 as a function of t. The phase modulator 320 imposes the phase changes on the optical carrier by taking digital lines out of a field programmable gate array (FPGA), amplifying them, and driving the EO phase modulator. The transmitted optical signal, T, is then given by Equation 6.

$$T = C \exp(i[\Box t + B(t)]) \tag{6}$$

where C is a constant that accounts for the reduction in $I_0$ by splitting of the fraction A and any amplification or further reduction imposed by the phase modulator 320.

Any phase modulator may be used as modulator 320. For example, an electro-optic modulator (EOM) is used that includes a crystal, such as lithium niobate, whose refractive index is a function of the strength of the local electric field. That means that if lithium niobate is exposed to an electric field, light will travel more slowly through it. But the phase of the light leaving the crystal is directly proportional to the length of time it takes that light to pass through it. Therefore, the phase of the laser light exiting an EOM can be controlled by changing the electric field in the crystal according to the digital code provided by the digital code module 372. The phase change induces a broadband frequency signal, with bandwidth B approximately equal to the baud rate, $1/\tau$.

The phase-encoded optical signal output by the phase modulator 320 is transmitted through some optical couplers, such as the polarizing beam splitter (PBS) 322 or other circulator optics, after which it is scattered by any object 390 in the beam carrying the transmitted signal. For example, it was found that the fiber coupled polarizing beam splitter combiners offer better isolation between the ports than the fiber based circulators as this optical component. This is important as signal that is not well isolated between transmit and receive will appear as an undesirable large peak in the range profiles. So the transmit signal is injected into port 1, is emitted out of port 2 and the back-scattered return signal is received in port 2 and exits port 3. Some targets (e.g., metal targets) maintain the polarization of the beam and some targets (e.g., diffuse targets) de-polarize the returned beam. In some implementations, a quarter wave plate is included in the transmit optics to properly compensate for targets that do not depolarize.

The returned signal 324 is directed by the optical coupler, e.g., PBS 322, to the optical mixer 360 where the return optical signal 324 is mixed with the reference optical signal (LO) 314 given by Equation 5. The returned signal R from the kth object intercepted by the transmitted beam is given by Equation 7a.

$$R_k = A_k \exp(i[(\omega + \omega_{Dk})(t + \Delta t_k) + B(t + \Delta t_k)]) \tag{7a}$$

where $A_k$ is a constant accounting for the loss of intensity due to propagation to and from the object 390 and scattering at the kth object 390, $\Delta t_k$ is the two way travel time between the LIDAR system and the kth object 390, and $\omega_{Dk} = 2\pi \Delta f_D$ is the angular frequency of the Doppler frequency shift (called Doppler shift herein for convenience) of the kth object. The electric field of the return signal, $E_R$, summed over all targets, is then given by Equation 7b.

$$E_R = \sum_k A_k e^{i[\omega(t + \Delta t_k) + \omega_{Dk}(t + \Delta t_k) + B(t + \Delta t_k)]} \tag{7b}$$

The coincident signals (e.g., return optical signal 324 and LO 314) at the optical mixer 360 produce a mixed optical signal 362 with a beat frequency related to a difference in frequency and phase and amplitude of the two optical signals being mixed, and an output depending on the function of the optical mixer 360. As used herein, down mixing refers to optical heterodyne detection, which is the implementation of heterodyne detection principle using a nonlinear optical process. In optical heterodyne detection, called "down-mixing" herein, an optical signal of interest at some optical frequency is non-linearly mixed with a reference "local oscillator" (LO) that is set at a close-by frequency. The desired outcome is a difference frequency, which carries the information (e.g., amplitude, phase, and frequency modulation) of the original optical frequency signal, but is oscillating at a lower more easily processed frequency, called a beat frequency herein, conveniently in the RF band. In some implementations, this beat frequency is in an RF band that can be output from the optical detector 330 as an electrical signal 332, such as an electrical analog signal that can be easily digitized by RF analog to digital converters (ADCs). The electrical signal 332 is input to the processing system 350 and used, along with the digital code from digital code module 372, by the Doppler compensation module 370 to determine cross correlation and range, and, in some implementations, the speed and Doppler shift.

In some implementations, the raw signals are processed to find the Doppler peak and that frequency, $\omega_D$, is used to correct the correlation computation and determine the correct range. In other implementations, it was discovered to be advantageous if the optical mixer and processing are configured to determine the in-phase and quadrature components, and to use that separation to first estimate $\omega_D$ and then use $\omega_D$ to correct the cross correlation computation to derive $\Delta t$. The value of $\omega_D$ is also used to present the speed of the object and the first time period is selected to adjust the resolution of $\omega_D$ and the speed of the object. The value of $\Delta t$ is then used to determine and present the range to the object using Equation 3 described above. The separation of the I and Q signals by the optical mixers enable clearly determining the sign of the Doppler shift.

An example hardware implementation to support the coherent detection of in-phase and quadrature (I/Q) signals of a phase coded transmitted signal, is demonstrated here. The advantage of this approach is a very cheap but high bandwidth waveform production requirement (binary digital or poly-phase digital codes) and minimal modulation requirements (single electro-optic phase modulator). A 90 degree optical hybrid optical mixer allows for I/Q detection of the optically down-mixed signals on two channels which are then digitized. This system allows for an extremely flexible "software defined" measurement architecture to occur.

FIG. 3B is a block diagram that illustrates example components of a Doppler compensated phase-encoded LIDAR system 300b, according to an implementation. This implementation uses binary phase encoding (e.g. with the phase code duration N*τ) with the two phases separated by π/2 but with optical separation of in-phase and quadrature components rather than electrical separation. Although an object 390 is depicted to illustrate operation of the system 300a, the object 390 is not part of the system 300a. The system includes laser source 310, beam splitter 312, phase modulator 320, polarizing beam splitter 322, a 90 degree hybrid mixer 361 in place of the generic optical mixer 360 of FIG. 3A, balanced photodetectors 331 in place of the photodetector 330 of FIG. 3A, and processing system 350, the latter including a digital code module 372 and a Doppler compensation module 371. Optical signals are represented by thick arrows and electrical signals by thin arrows. A laser 310 produces an optical signal at an optical carrier frequency fc. Splitter 312 directs a small portion of the power of the signal to use as a reference signal (called a local oscillator) LO 314. The digital code module 372 in the processing system 350 sends an electrical signal that indicates a digital code (e.g. M blocks, each block with the phase code duration N*τ) of symbols to be imposed as phase changes on the optical carrier. The phase modulator 320 imposes the phase changes on the optical carrier, as described above.

The phase-encoded optical signal output by the phase modulator 320 is transmitted through some optical couplers, such as the polarizing beam splitter (PBS) 322, after which it is scattered by any object 390 intercepted by the beam carrying the transmitted signal. The returned signal 324 is directed by the optical coupler, e.g., PBS 322, to the 90 degree Hybrid optical mixer 361 where the return optical signal 324 is mixed with the reference optical signal (LO) 314 given by Equation 5b. The returned signal R is given by Equation 7a. The Hybrid mixer outputs four optical signals, termed I+, I−, Q+, and Q−, respectively, combining LO with an in-phase component of the return signal R, designated $R_I$, and quadrature component of the return signal R, designated $R_Q$, as defined in Equation 8a through 8d.

$$I+ = LO + R_I \tag{8a}$$

$$I- = LO - R_I \tag{8b}$$

$$Q+ = LO + R_Q \tag{8c}$$

$$Q- = LO - R_Q \tag{8d}$$

where $R_I$ is the in phase coherent cross term of the AC component of the return signal R and $R_Q$ is the 90 degree out of phase coherent cross term of the AC component of the return signal R. For example, the electrical field of the above relations can be expressed based on Equations 5b and Equation 7b above and Equation 8e through Equation 8g below to produce Equations 8h through Equation 8k.

$$LO = |E_{LO}|^2 \tag{8e}$$

$$R_I = |E_R|^2 + \text{Real}(E_R E^*_{LO}) \tag{8f}$$

$$R_Q = |E_R|^2 + \text{Imag}(E_R E^*_{LO}) \tag{8g}$$

where * indicate a complex conjugate of a complex number, Imag( ) is a function that returns the imaginary part of a complex number, and Real( ) is a function that returns the real part of a complex number. The AC term $E_R E^*_{LO}$ cancels all of the optical frequency portion of the signal, leaving only the RF "beating" of LO with the RF portion of the return signal—in this case the Doppler shift and code function. The terms $|E_{LO}|^2$ and $|E_R|^2$ are constant (direct current, DC) terms. The latter is negligible relative to the former; so the latter term is neglected in the combinations expressed in Equations 8h through Equation 8k, as particular forms of Equation 8a through Equation 8d.

$$I+ = |E_{LO}|^2 + \text{Real}(E_R E^*_{LO}) \tag{8h}$$

$$I- = |E_{LO}|^2 - \text{Real}(E_R E^*_{LO}) \tag{8i}$$

$$Q+ = |E_{LO}|^2 + \text{Imag}(E_R E^*_{LO}) \tag{8j}$$

$$Q- = |E_{LO}|^2 - \text{Imag}(E_R E^*_{LO}) \tag{8k}$$

The two in-phase components I+ and I− are combined at a balanced detector pair to produce the RF electrical signal I on channel 1 (Ch1) and the two quadrature components Q+ and Q− are combined at a second balanced detector pair to produce the RF electrical signal Q on channel 2 (Ch2), according to Equations 9a and 9b.

$$I = I+ - I- \tag{9a}$$

$$Q = Q+ - Q- \tag{9b}$$

The use of a balanced detector (with a balanced pair of optical detectors) provides an advantage of cancellation of common mode noise, which provides reliable measurements with high signal to noise ratio (SNR). In some implementations, such common mode noise is negligible or otherwise not of concern; so, a simple optical detector or unbalanced pair is used instead of a balanced pair.

In some implementations the LO signal alternates between in-phase and quadrature versions of the transmitted signal, so that the electrical signals I and Q are measured at close but different times of equal duration.

The Doppler compensation module 371 then uses the signals I and Q to determine, over a time period of a first duration that is at least the duration of one block of code, one or more Doppler shifts $\omega_D$, with corresponding speeds. In some implementations, the resolution of the Doppler shift (and hence the speed resolution) is increased by extending the first duration to a multiple of the duration of one block of code, provided the multiple blocks are sampling, or expected to sample, the same object, as explained in more detail below.

The value of $\omega_D$ and the values of B(t) from the digital code module 372 and the signals I and Q are then used to produce, over a corresponding time period (e.g. with a second duration at least the duration of one block of code) a corrected correlation trace in which peaks indicate one or more $\Delta t$ at each of the one or more speeds. When multiple speeds are detected, each is associated with a peak in the corresponding multiple correlation traces. In some implementations, this is done by coincidence processing, to determine which current speed/location pairing is most probably related to previous pairings of similar speed/location. The one or more $\Delta t$ are then used to determine one or more ranges using Equation 3, described above. To increase the range resolution, it is desirable to do this calculation over as short a time period as possible, e.g., with the second duration equal to the duration of one block of code.

Thus, in general, the first duration and the second duration are different. For both increased Doppler shift resolution and increased range resolution, it is advantageous for the first duration to be longer than the second duration. This can be accomplished by storing, e.g., in a memory buffer, several blocks of previous returns to extend the first duration.

It is advantageous to prepare a frequency domain representation of the code used for correlation at the start and re-used for each measuring point in the scan; so, this is done in some implementations. A long code, of duration D=(M*N)*$\tau$, is encoded onto the transmitted light, and a return signal of the same length in time is collected by the data acquisition electronics. Both the code and signal are broken into M shorter blocks of length N and phase code duration N*$\tau$ so that the correlation can be conducted several times on the same data stream and the results averaged to improve signal to noise ratio (SNR). Each block of N symbols and phase code duration N*$\tau$ is distinctive from a different block of N symbols and therefore each block is an independent measurement. Thus, averaging reduces the noise in the return signal. The input I/Q signals are separated in phase by $\pi/2$. In some implementations, further averaging is done over several illuminated spots not expected to be on the same object in order to remove the effect of reflections from purely internal optics, as described in previous work.

3.2. Optical Detection Method

The presented approaches increase the resolution or signal to noise ratio or both for taking advantage of the phase difference to compute a cross-spectrum using the I/Q signals (either in the electrical or optical signals), which provides a clear peak at the Doppler frequency. The approach also takes advantage of the phase difference of the I/Q signals to construct a complex signal for the correlation to determine range. Doppler compensation is accomplished by first taking the FFT of the complex return signals, then shifting the values of the FFT within the array of frequency bins. The corrected signals can be recovered by applying an inverse-FFT to the shifted FFT, but this is not necessary since the shifted FFT is used directly in the correlation with the code FFT in some implementations. In other implementations, the complex return signals are multiplied by a complex exponential formed from the Doppler frequency measured in the cross spectrum, and an FFT of the corrected signals is used for correlation with the code. In some implementations, the correlation is determined using a finite impulse response (FIR) filter. After a correlation (also called a range profile, herein) is calculated for each code/signal block, the results are averaged over the M blocks, and the range to the target is calculated from the time delay of the peak in the averaged range profile. If there is more than one peak in the range profile, then the approach will record the range to multiple targets. The presented approach utilizes asynchronous processing of the Doppler frequency shift and the range to the target over different time periods, so that a resolution of the Doppler frequency shift and speed of the object can be optimized.

Figure 4B:
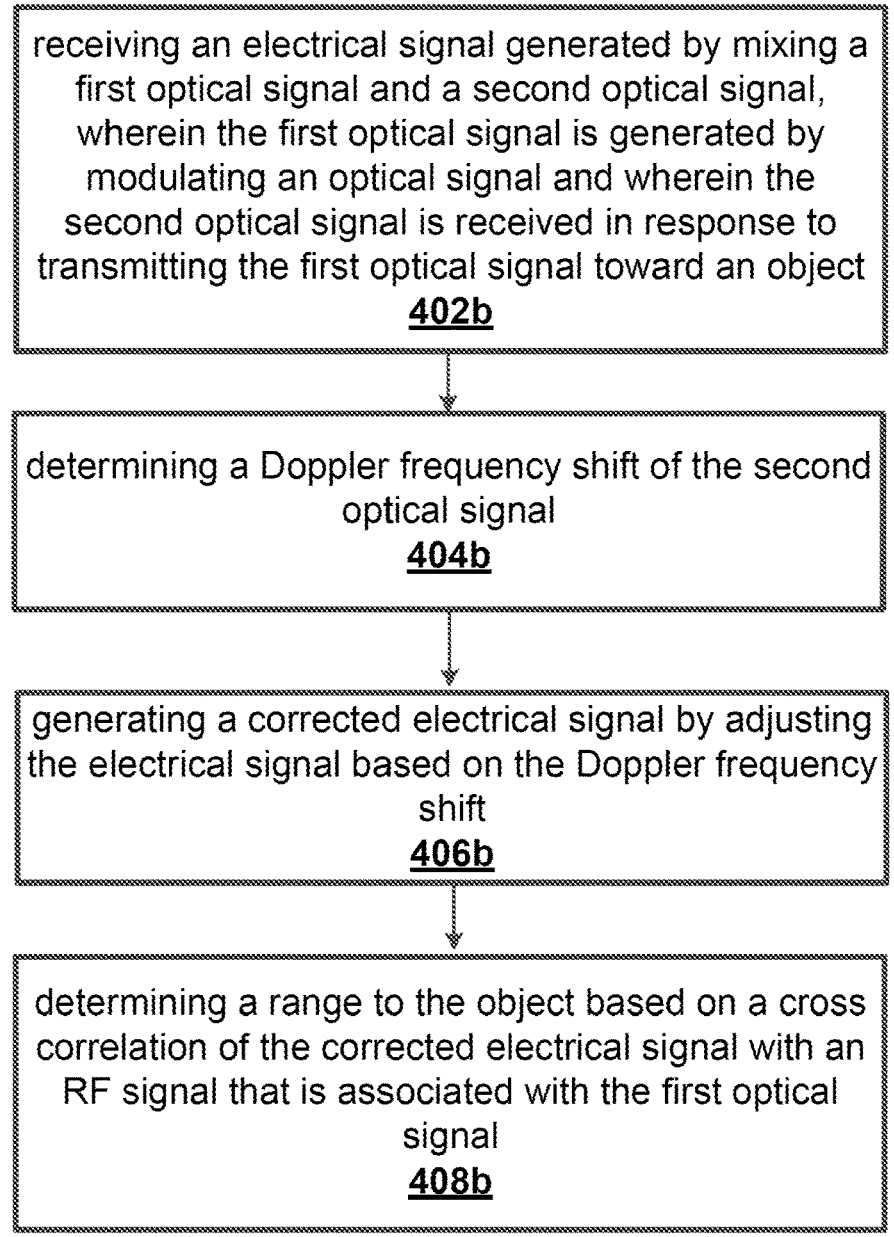
FIG. 4B is a flow chart that illustrates an example method for enhancing velocity resolution and signal to noise ratio in optical phase-encoded range detection, according to an implementation.

FIG. 4A is a flow chart that illustrates an example method 400 for using Doppler-corrected phase-encoded LIDAR system to determine and compensate for Doppler effects on ranges, according to an implementation. Although steps are depicted in FIGS. 4A and 4B as integral steps in a particular order for purposes of illustration, in other implementations, one or more steps, or portions thereof, are performed in a different order, or overlapping in time, in series or in parallel, or are omitted, or one or more additional steps are added, or the method is changed in some combination of ways. In some implementation, steps 403 and 410 through 433 and/or steps 451 through 461 are performed by processing system 350. For example, determining the FFT of the digital code in step 403 and all of steps 410 through 433 and/or steps 451 through 461 are performed by Doppler compensation module 370 in FIG. 3A or module 371 in FIG. 3B.

In step 401, a transceiver, e.g., a LIDAR system, is configured to transmit phase-encoded optical signals based on input of a phase code sequence. A portion (e.g., 1% to 10%) of the unmodulated input optical signal from the laser, or the phase-encoded transmitted signal, is also directed to a reference optical path. The transceiver is also configured to receive a backscattered optical signal from any external object illuminated by the transmitted signals. In some implementations, step 401 includes configuring other optical components in hardware to provide the functions of one or more of the following steps as well, as illustrated for example in FIG. 3A or FIG. 3B, or equivalents. Note that the transmitted signal need not be a beam. A diverging signal will certainly see a lot of different ranges and Doppler values within a single range profile; but, provide no cross range resolution within an illuminated spot. However, it is advantageous to use a narrow beam which provides inherent sparsity that comes with point by point scanning to provide the cross range resolution useful to identify an object.

In step 403 a code made up of a sequence of M*N symbols is generated for use in ranging, representing M blocks of N symbols, with no duplicates among the M blocks. In some implementations, the Fourier transform of an RF signal with such phase encoding is also determined during step 403 because the transform can be used repeatedly in step 423 as described below and it is advantageous to not have to compute the Fourier transform separately for each transmission. For example, a complex (real and imaginary components) digital signal is generated with angular RF frequency $\omega$ and phase $\pi/2$ according to the code is generated, and a complex digital Fast Fourier Transform (FFT) is computed for this complex digital signal. The resulting complex FFT function is prepared for the operation in step 423 by taking the complex conjugate of the complex signal. For example the complex conjugate of the complex FFT, Code$_{FFT}$, is represented by Equation 10 for each of M blocks of the code.

$$\text{Coder}_{FFT} = \text{conj}(\text{FFT}(\exp(iBt))) \quad (10)$$

where conj( ) represents the complex conjugate operation, which is conj(x+iy)=x−iy. This complex FFT is stored, for example on a computer-readable medium, for subsequent use during step 423, as described below.

In step 405 a first portion of the laser output, represented by Equation 4, is phase-encoded using code received from digital code module 372 to produce a transmitted phase-encoded signal, as represented by Equation 6, and directed to a spot in a scene where there might be, or might not be, an object or a part of an object. In addition, in step 405 a second portion of the laser output is directed as a reference signal, as represented by Equation 5a or Equation 5b, also called a local oscillator (LO) signal, along a reference path.

In step 407, the backscattered returned signal, R, with any travel time delay Δt and Doppler shift $\omega_D$, as represented by Equation 7, is mixed with the reference signal LO, as represented by Equation 5a or Equation 5b, to output one or more mixed optical signals 362. The mixed signal informs on the in-phase and quadrature components. For example, in the implementation illustrated in FIG. 3B, the mixed optical signals 362 include four optical signals that inform on in-phase and quadrature components, namely I+, I−, Q+, Q− as defined in Equations 8a through 8d. In other implementations, other optical mixers are used. For example, in some implementations, a 3×3 coupler is used in place of a 90 degree optical hybrid to still support I/Q detection.

In step 408, the mixed optical signals are directed to and detected at one or more optical detectors to convert the optical signals to one or more corresponding electrical signals. For example, in the implementation illustrated in FIG. 3B, two electrical signals are produced by the detectors. One electrical signal on one channel (Ch 1) indicates down-mixed in-phase component I given by Equation 9a; and the other electrical signal on a different channel (CH 2) indicates down-mixed quadrature component Q given by Equation 9b. A complex down-mixed signal S is computed based on the two electrical signals, as given by Equation 11.

$$S = I + iQ \quad (11a)$$

Note that the signals S, I and Q are functions of time, t, of at least duration D=M*N*τ.

In some implementations, averaging is performed over several different return signals S(t) to remove spurious copies of the phase-encoded signal produced at internal optical components along the return signal path, such as PBS 322. Such spurious copies can decrease the correlation with the actual return from an external object and thus mask actual returns that are barely detectable. If the averaging is performed over a number P of different illuminated spots and returns such that a single object is not in all those illuminated spots, then the average is dominated by the spurious copy of the code produced by the internal optical components. This spurious copy of the code can then be removed from the returned signal to leave just the actual returns in a corrected complex electrical signal S(t). P is a number large enough to ensure that the same object is not illuminated in all spots. A value as low as P=100 is computationally advantageous for graphical processing unit (GPU) implementations; while a value as high as P=1000 is preferred and amenable to field-programmable gate array (FPGA) implementations. In an example implementation, P is about 100. In other implementations, depending on the application, P can be in a range from about 10 to about 5000. FIG. 11 is a block diagram that illustrates example multi-spot averaging to remove returns from internal optics, according to an implementation. Steps 409 and 410 perform this correction.

In step 409 it is determined whether P returns have been received. If not, control passes to back to step 405 to illuminate another spot. If so, then control passes to step 410. In step 410 the average signal, $S_S(t)$ is computed according to Equation 11b where each received signal of duration D is designated $S_p(t)$.

$$S_S(t) = \frac{1}{P} \sum_{p=1}^{P} S_p(t) \quad (11b)$$

This average signal is used to correct each of the received signals $S_p(t)$ to produce corrected signals $S_{pC}(t)$ to use as received signal S(t) in subsequent steps, as given by Equation (11c)

$$S(t) = S_{pC}(t) = S_p(t) - S_S(t) \quad (11c)$$

In some implementations, the internal optics are calibrated once under controlled conditions to produce fixed values for $S_S(t)$ that are stored for multiple subsequent deployments of the system. Thus, step 410 includes only applying Equation 11c. In some implementations, the spurious copies of the code produced by the internal optics are small enough, or the associated ranges different enough from the ranges to the external objects, that step 409 and 410 can be omitted. Thus, in some implementations, steps 409 and 410 are omitted, and control passes directly from step 408 to step 411, using S(t) from step 408 rather than from Equation 11c in step 410.

In some implementations, additional corrections are applied to the electrical signal S(t) during step 410 based on the average signal $S_S(t)$. For example, as described in more detail in section 4.4, phase and frequency drift of the laser is detected in the evolution of the signals S p (t) over different spots or the evolution of the average signal $S_S(t)$ over each set of p spots. Such observed drift is used to formulate corrections that amount to digitally compensating for laser linewidth issues cause by hardware or other sources of noise. In another example described in more detail in examples section 4.5, drift with temporal evolutions on much shorter scales, e.g., on the scale of each block of N coded symbols, is used to compensate for signal to noise ratio (SNR) reduction due to coherence broadening in the Doppler frequency domain.

In step 411, a cross spectrum is used to detect the Doppler shift. The following explanation is provided for purposes of illustration; however, the features and utility of the various techniques are not limited by the accuracy or completeness of this explanation. The frequency content of I and Q contain the Doppler (sinusoidal) and the Code (square wave). For the Doppler component, I is expected to lag or advance Q by 90 degrees as it is sinusoidal. The lag or advance depends on the sign of the Doppler shift. The code component does not demonstrate this effect—the I and Q levels that indicate the returning bits as a function of time move either in-phase or 180 degrees out of phase. The operation inside the brackets of the XS operation computes the complex phasor difference between I and Q at a given frequency. If there is a 90 degree phase difference between I and Q at a given frequency (as in the case of the Doppler component) this will be manifest in the imaginary part of the result. Code frequency content will conversely not appear in the imaginary part of the result, because as was stated above, the I and Q aspects of the code are either in phase or 180 degrees out of phase for the chose binary code, so the complex phasor difference at each frequency is always real. The cross spectrum operation, XS( ), can be viewed as a way of revealing only those aspects of the signal spectrum relating to Doppler, with the code dropping out. This makes it easier to find the Doppler frequency content. In contrast, in a regular spectrum of the return signal, the code frequency content could obscure the Doppler frequency content desired to make good Doppler estimates/corrections.

For example, the cross-spectrum of S is calculated as given by Equation 12.

$$XS(S) = FFF(I)*conj[FFT(Q)] \tag{12}$$

XS(S) resulting from Equation 12 is a complex valued array. The peaks in this cross spectrum represent one or more Doppler shifts $\omega_D$ in the returned signal. Note that $\omega_D = 2\pi\Delta f_D$. Any peak detection method may be used to automatically determine the peaks in the cross spectrum XS(S). In general, identification of large positive or negative peaks in the imaginary components of the cross spectrum will reveal information about Doppler shifts. However, under some special circumstances the real part may also reveal such information. An example of such a circumstance would be the presence of multiple range returns with similar Doppler values. Elevated amplitude in the real part can indicate such a circumstance. In some implementations, the cross spectrum operation is performed separately on each block of data and averaged over the M blocks. These Doppler shifts and corresponding relative speeds are stored for further use, e.g., on one or more computer-readable media. As described in further detail next, the power spectrum is also useful for identifying the Doppler shift and getting the phase.

In some implementations, the Doppler shift is computed over several blocks to increase the frequency resolution (and thus the speed resolution). The resolution of the velocity measurement is fundamentally limited by the coherent processing interval (CPI), e.g., the duration of one block of symbols having a duration equal to N*τ. The CPI limits the frequency resolution of the measurement to 1/CPI and ultimately limits the resolution of Doppler frequencies and corresponding velocity measurements of the LIDAR system. The measured signals are flexible to asynchronous processing of Doppler and range. If more Doppler shift resolution (and hence velocity resolution) is desired, it is possible to buffer a duration of time domain data longer than the duration of one block of the phase coded waveform. This segment of time domain data can then be analyzed with a cross-spectrum or power spectrum to resolve the velocity of targets at a finer velocity resolution.

The increased duration comes with some computational costs, because the cross-spectrum computation increases with increasing number of samples in the signal. However, the sampling rate (samples per second) determines the highest unambiguous frequency (the Nyquist frequency=sampling rate/2). The Nyquist frequency often corresponds to a Doppler shift velocity that vastly exceeds any expected velocity. Thus, computational costs can be reduced (e.g., shorter FFTs and shorter peak searches) without loss of meaningful velocity measurement space by down sampling to a lower sampling rate, e.g., by averaging several successive samples before calculating the cross-spectrum. These concepts are illustrated in FIG. 5A through FIG. 5C.

Figure 5A:
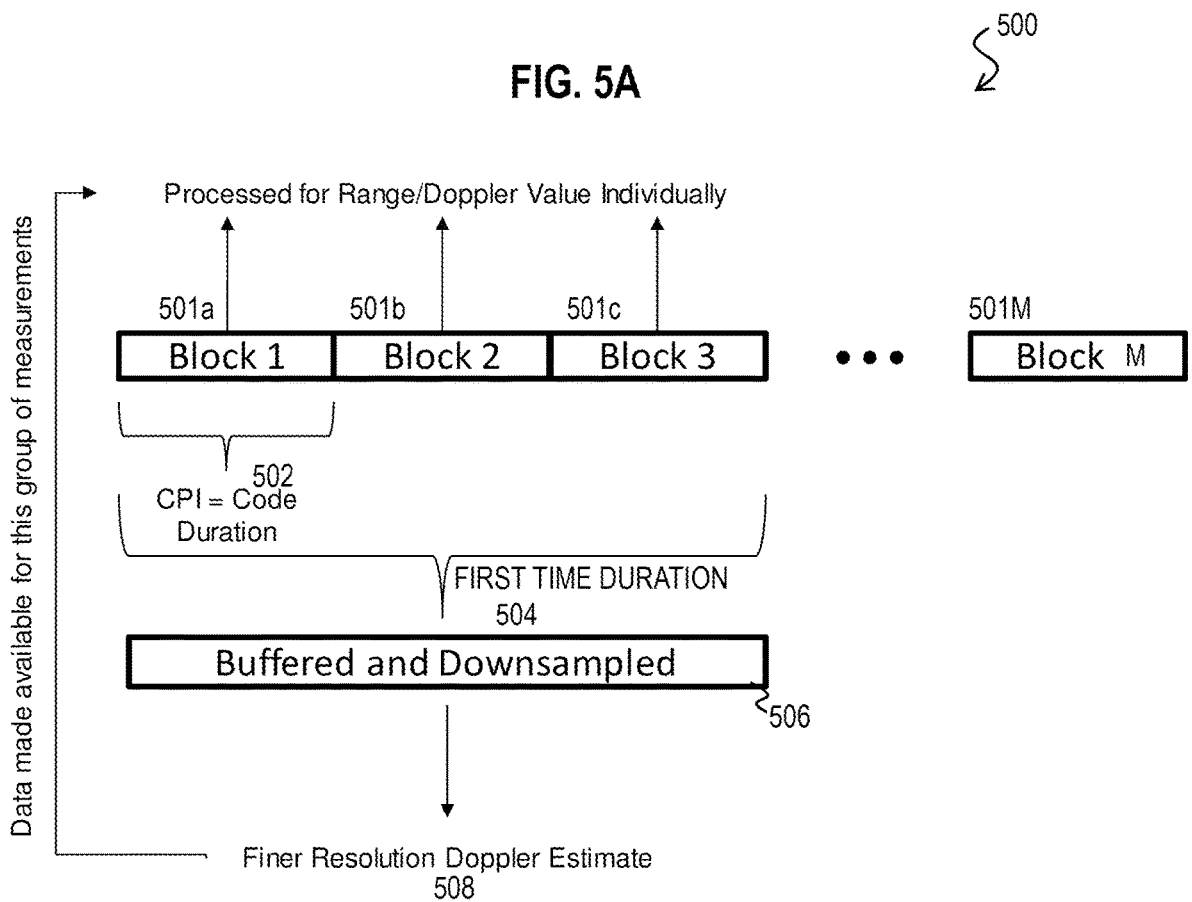
FIG. 5A is a block diagram that illustrates an example of a plurality of time blocks and a first duration longer than each time block, where each time block is a duration of the phase code of FIG. 1B, according to an implementation.
Figure 5B:
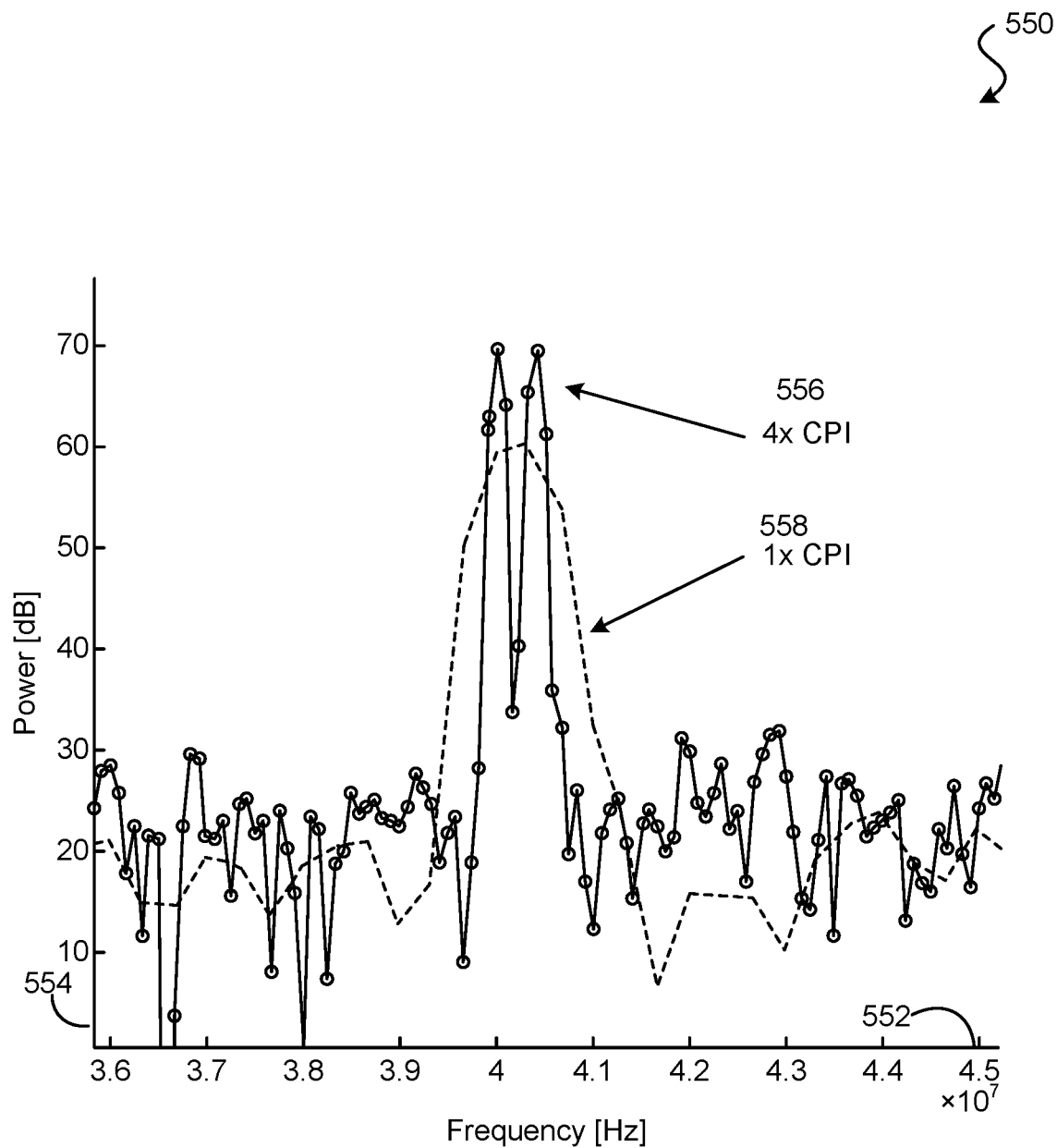
FIG. 5B is a graph that illustrates example power spectra versus frequency computed for each time block and for a first duration of multiple time blocks, according to an implementation.
Figure 5C:
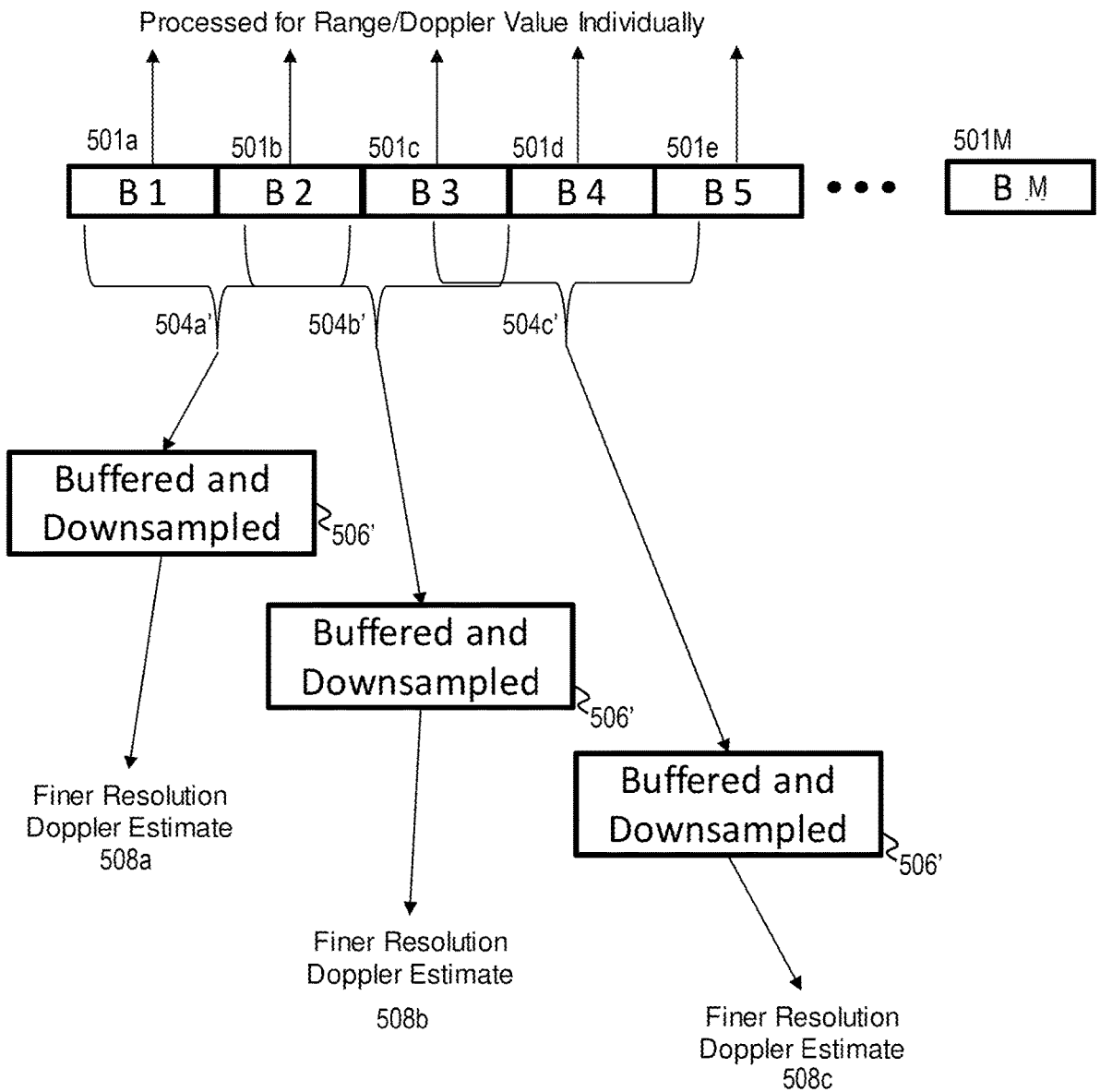
FIG. 5C is a block diagram that illustrates an example of the plurality of time blocks and a plurality of time periods of the first duration of FIG. 5A where the successive time periods are overlapping, according to an implementation.

FIG. 5A is a block diagram that illustrates an example of a plurality of time blocks and a first duration longer than each time block, where each time block is a duration of one block of the phase code of FIG. 1B, according to an implementation. In some implementations, multiple blocks having a first duration are processed together and down-sampled to determine the Doppler shift with high resolution without loss of expected Doppler shifts. Each block of N symbols, having a shorter second duration, is processed individually for a range value using the corresponding Doppler shift measurement; and, M blocks are averaged to increase signal to noise for range to a single spot. The first duration for computing the Doppler shift can be shorter or longer than the M blocks averaged for each spot. FIG. 5B is a graph that illustrates example power spectra versus frequency computed for each time block and for a first duration of multiple time blocks, according to an implementation. Two returns with different Doppler shifts are resolved in the solid trace for which the first duration is equal to four code blocks (4×CPI). Those two returns are not distinguished in the dashed trace using a duration equal to one block (of duration equal to the CPI). Successive time intervals of the first duration for computing the Doppler shift can overlap, be contiguous, or be disconnected, in various implementations. FIG. 5C is a block diagram that illustrates an example of the plurality of time blocks and a plurality of time periods of the first duration of FIG. 5A where the successive time periods are overlapping, according to an implementation. An example implementation is described in more detail in section 4.1.

These methods result in an asymmetric power or cross spectrum allowing the discernment of the sign of the Doppler frequency shift by the location of the beatnote peak from the residual carrier. In some implementations, the electrical signal is real valued; e.g., there are not separate electrical signals for the real and complex parts of the return, or in-phase and quadrature parts of the return signal. In such implementations, the Doppler shift is still determined by a cross spectrum of two identical time series, which is equivalent to the auto-spectrum, simply called the spectrum. Thus as used herein a spectrum refers to a cross spectrum when the two time series are identical. Thus, if only a single phase of the optical field is measured in the time domain, the input time domain data is real and so after an FFT the power or cross-spectrum is symmetric about the DC (f=0) frequency bin and the negative half of the frequency spectrum is just the complex conjugate of the positive half of the frequency spectrum. Therefore, if a Doppler shift is present, two identical amplitude peaks are observed symmetric about 0 Doppler shift and the sign of the frequency shift is not known.

In step 413 the complex Fourier transform of the complex down mixed returned signal, S, is determined, for example using a complex FFT function FFT(S) implemented in hardware or software.

In step 421, the FFT(S) is shifted by the Doppler shift to produce a corrected spectrum, $S_{FFT}$, as given by Equation 14a or 14b, described below, for a current Doppler shift of the zero or more Doppler shifts observed in step 411. As indicated in Foucras 2014 equation 27, the time shift-theorem can be applied to achieve Doppler code compensation. Indeed, the time-shift frequency theorem is given by Equation 13.

$$F(x(t+\delta)) = \exp(i\zeta\delta)F(\zeta) \tag{13}$$

where F indicates the Fourier operator, x(t) is a function of time t, δ is a time shift, and F(ζ) indicates the Fourier transform of x(t). Then, for an FFT-based acquisition method, the code delay induced by code Doppler can be compensated by multiplying in the frequency domain the FFT of the local spreading code by the complex exponential. The advantage of this method is that if the Fourier transform of the spreading code sequence has been built and stored in the memory, then the Fourier transform of the receded (or extended) spreading code can be transformed to the frequency domain in a simple way. Then the correct spreading code can be produced quickly. This technique was patented by Krasner 1998. The effect of the Doppler is to frequency shift the spectrum of the code. Thus when using the convolution theorem to quickly compute the cross correlation, the frequency content of the measured code does not match the frequency content of the reference. By Doppler compensating, the frequency spectra are brought back into alignment and the cross correlation is again effective.

In some implementations, the correct spectrum is computed using Equation 14a.

$$S_{FFT} = \text{circshift}(FFT(S), \omega_D) \tag{14a}$$

where circshift (x,y) shifts a function x of an independent variable over a finite domain by an amount y in the independent variable such that anything shifted off one end of the finite domain is shifted on to the opposite end of the finite domain. In some implementations, the correct spectrum is computed using Equation 14b, which removes the Doppler effect by multiplication with a complex exponential and then calculating the FFT, as indicated in Equation 13.

$$S_{FFT} = FFT(S^* \exp(-i\omega_D t)) \tag{14b}$$

In some implementations, step 421 includes.

In step 423 the cross-correlation, XC, of the phase encoding, exp(iB(t)), with the corrected complex signal, Scorr, is determined, designated XC(Code, Scorr) for each of the M independent blocks of N symbols, and then averaged. In some implementations, this is done by taking the inverse Fast Fourier Transform (invFFT) of the corrected complex spectrum $S_{FFT}$ and correlating that corrected complex return Scorr with the digital signal exp(iB(t)) representing the code, as given by Equation 15a.

$$XC(\text{Code}, \text{Scorr}) = \frac{1}{M} \sum_{m=1}^{M} correl[\exp(iB_m(t)), invFFT(S_{FFT})] \tag{15a}$$

where correl(x,y) is a function that determines the correlation of series x with series y and $B_m(t)$ is the code for the mth block. Both the invFFT and correl functions involve multiple operations on each member of the series. In some implementations, computational resources are saved by performing a multiply in Fourier space using the S FFT already determined in step 421, and then taking an inverse FFT, as given by Equation 15b.

$$XC(\text{Code}, \text{Scorr}) = \frac{1}{M} \sum_{m=1}^{M} invFFT[FFT\{\exp(iB_m(t))\} * (S_{FFT})] \tag{15b}$$

Any peaks in the XC(Code, Scorr) are used to determine a delay time, Δt, at the current Doppler shift, and the zero or more delay times are used to compute zero or more corresponding ranges at the current Doppler shift.

In some implementations, the FFT based convolution to determine the cross correlation (XC) can also be efficiently performed with a finite-impulse-response (FIR) filter based convolution as given by Equation 15c. This has the potential to be more efficient for some shorter code lengths and in some computational hardware settings (FPGA). For each range bin, k, in the cross-correlation.

$$XC(\text{Code}, \text{Scorr}, k) = \frac{1}{M} \sum_{m=1}^{M} circshift[\exp(iB_m(t)), k] * invFFT[(S_{FFT})] \tag{15c}$$

Note that the dot multiply (*) implies a series of inner products at different shifts (k) between the reference code B. and the corrected signal S. As can be seen, the FIR approach of Equation 15c implies a simple register shift operation and simple multiply compared to the more complicated FFT method of Equation 15b. The repeated shift and multiply of the FIR approach can be more computationally efficient for shorter codes, B.

Step 423 includes finding any peaks (zero or more) in the range bins to indicate the ranges, if any, where some external object has scattered the transmitted beam. With noise and speckle, there will be variability in the returns from each range bin. A peak detection process determines whether the variability from one range bin to the next indicates an actual scatterer or not. The decision can be difficult.

In some implementations, the phase of a return from any range bin can be related to the Doppler shifts already detected in step 411. If the measured phase in that bin does not match the expected phase, given the known Doppler shift, then that return is eliminated as a range of an actual scatterer and that range bin is ignored or discarded. This is described in more detail in examples section 4.2.

Figure 7:
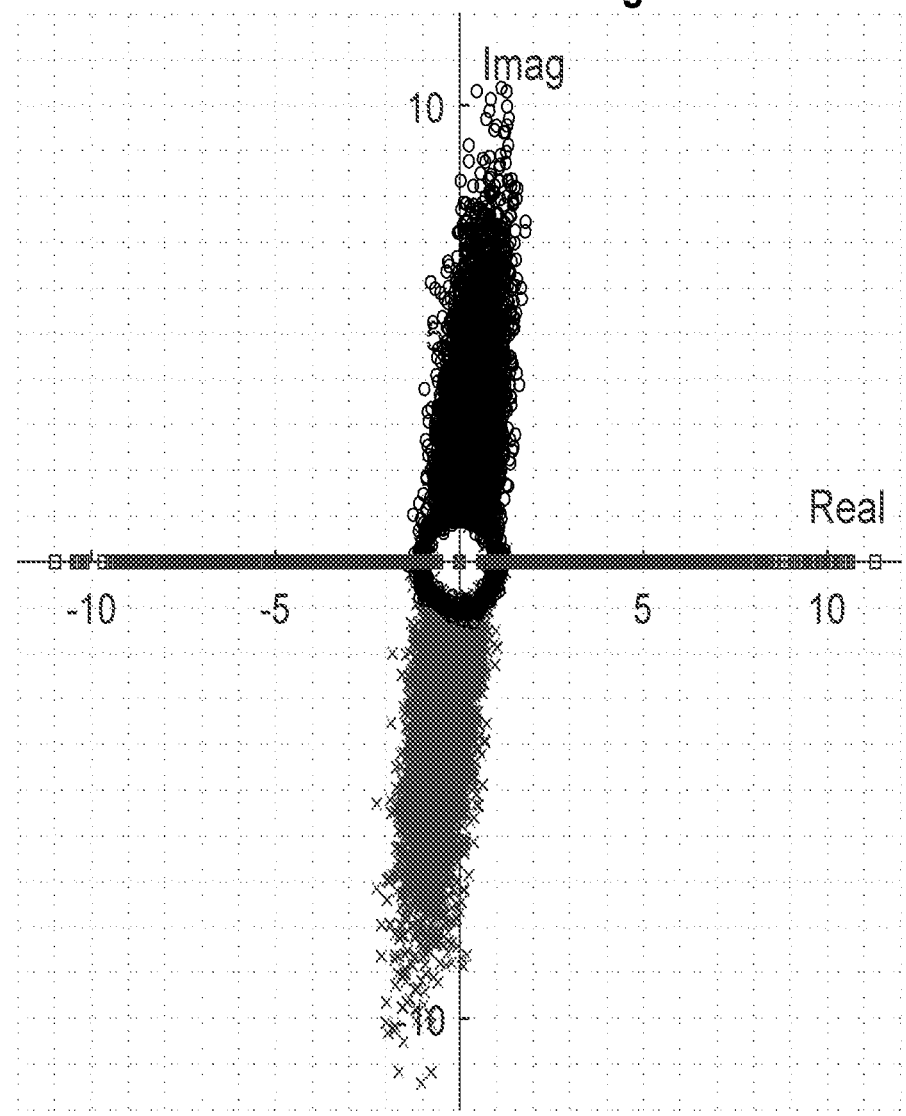
FIG. 7 is a graph that illustrates example dependence of phase compensated complex value(s) of the range peak on sign of the Doppler shift, according to an implementation.

In some implementations that do not use in-phase and quadrature separation of electrical signals, the spectrum determined in step 411 has equal peaks at both positive and negative values of the Doppler shift (e.g., in FIG. 1D in addition to the peak at $f_S = f_0 + \Delta f_D$, there would be a second peak of equal height at $f_0 - \Delta f_D$); and, the correct sign of the Doppler shift cannot be determined from the spectrum. While Equations 15a through 15c can be used to determine range with unsigned Doppler shifts available in some implementations (because either positive or negative Doppler shift can be used), the signed Doppler shift is still of value, e.g., in velocity sensors, or for control of a vehicle. It was discovered that the phase of the return signal in Equation 16a depends on the sign of the Doppler shift—with positive and negative Doppler shifts appearing on opposite sides of the unit circle depicting phase. If the magnitude of the Doppler frequency shift and the range of the target is known, e.g., due to a strong Doppler peak and a strong peak at a particular range bin or range bins, then the signed Doppler can be inferred as described in more detail in example section 4.3. FIG. 7 is a graph that illustrates example dependence of phase compensated complex value(s) of the range peak on sign of the Doppler shift, according to an implementation. The circles indicate a blue shift Doppler data set, the x's indicate a red shifted Doppler data set, and the squares along the real axis indicate a DC (i.e. zero Doppler shift) data set As can be seen, the blue shift (positive) Doppler shift data have positive imaginary parts; the red shift (negative) Doppler shift data have a negative imaginary parts; and, the zero shift data have zero imaginary parts and result in real-valued range peaks.

In some implementations the computation of the cross correlation with the FFT of the codes signal is modified to digitally compensate for coherence broadening in the Doppler domain due to continuous phase and frequency fluctuations with evolution on the order of the CPI of the phase coded LIDAR pulse. This compensation is described in more detail below in example section 4.5.

In step 425, it is determined whether there is another Doppler shift, e.g., when more than one Doppler shift is detected in step 411. If so, control passes back to step 421 to correct the complex return spectrum FFT(S) with the next Doppler shift. If not, control passes to step 427. In step 427, Doppler ambiguity, if any, is removed, for example, by coincidence processing as described above. There exists some potential for so called "split-pixel" scenarios to occur while scanning. In such scenarios, the beam may be clipped so that part of it measures a surface at one range and Doppler and the other part(s) measures different range(s) and Doppler(s). In such a scenario, an efficient processing strategy is required to extract all relevant information. For example, the cross spectrum could sense multiple non-zero Doppler values. This would lead to multiple Doppler corrections and cross correlations. One strategy is to coherently sum the Doppler corrected time domain signals prior to a single cross correlation. This avoids the computational burden of multiple cross correlations at the expense of some ambiguity in the range-Doppler pairing and the addition of the noise component of each corrected signal to the final range profile. The ambiguity could be sorted out with a spatial correspondence algorithm designed to find the "most likely" range-Doppler pairing on the basis of spatial proximity to non-ambiguous (single range-Doppler) points. The additive noise may not be sufficient to be a concern. This processing strategy is worth considering as multi-return capability can be desirable for some users. In some implementations, step 427 is omitted and control passes directly to step 431.

In step 431, it is determined whether there is another spot to illuminate in a scene of interest, e.g., by scanning to view a new spot in the scene of interest. If so, control passes back to step 405 and following steps to illuminate the next spot and process any returns. In some implementations using multi-spot averaging, the new spot is added to the average and the oldest spot is removed, or P new spots are collected in the loop formed by steps 405 through 409. If there is not another spot to illuminate, then the results are used, and control passes to step 433.

In step 433, a device is operated based on the Doppler effect or the corrected ranges. In some implementations, this involves presenting on a display device an image that indicates a Doppler corrected position of any object at a plurality of spots illuminated by the transmitted optical signal. In some implementations, this involves communicating, to the device, data that identifies at least one object based on a point cloud of Doppler corrected positions at a plurality of spots illuminated by transmitted optical signals. In some implementations, this involves presenting on a display device an image that indicates a size of the Doppler effect at a plurality of spots illuminated by the transmitted optical signals, whereby moving objects are distinguished from stationary objects and absent objects. In some implementations, this involves moving a vehicle to avoid a collision with an object, wherein a closing speed between the vehicle and the object is determined based on a size of the Doppler effect at a plurality of spots illuminated by the transmitted optical signal. In some implementations, this involves identifying the vehicle or identifying the object on the collision course based on a point cloud of Doppler corrected positions at a plurality of spots illuminated by the transmitted optical signal. Filtering the point cloud data based on Doppler has the effect of identifying and removing vegetation that may be moving in the breeze. Hard objects, man-made objects, or dense objects are then better revealed by the filtering process. This can be advantageous in defense and surveillance scenarios. In the vehicle scenario—the Doppler can be used to segment objects (i.e. road surface versus moving vehicle).

In some implementations with multiple Doppler shifts for a single return, step 433 includes associating each delay time with one of the Doppler shifts, assuming that a particular return is based on an object or part of an object moving at a particular average speed over the duration of one transmitted signal for a given Doppler correction, only those range peaks associated with that Doppler correction will be present in the cross correlation. So it is improbable to incorrectly pair a given range and Doppler in the case of multiple instances. Put another way, the ambiguity function of this approach guarantees that there can be no confusion.

FIG. 4B is a flow chart that illustrates an example method for enhancing velocity resolution and signal to noise ratio in optical phase-encoded range detection, according to an implementation. Although steps are depicted in FIG. 4B as integral steps in a particular order for purposes of illustration, in other implementations, one or more steps, or portions thereof, are performed in a different order, or overlapping in time, in series or in parallel, or are omitted, or one or more additional steps are added, or the method is changed in some combination of ways. In some implementation, some or all operations of method 400b may be performed by processing system 350.

The method 400b includes operation 402b of receiving an electrical signal generated by mixing a first optical signal and a second optical signal, wherein the first optical signal is generated by modulating an optical signal and wherein the second optical signal is received in response to transmitting the first optical signal toward an object. The method includes the operation 404b of determining a Doppler frequency shift of the second optical signal. The method includes the operation 406b of generating a corrected electrical signal by adjusting the electrical signal based on the Doppler frequency shift. The method includes the operation 408b of determining a range to the object based on a cross correlation of the corrected electrical signal with an RF signal that is associated with the first optical signal.

4. Example Implementations

Figure 8:
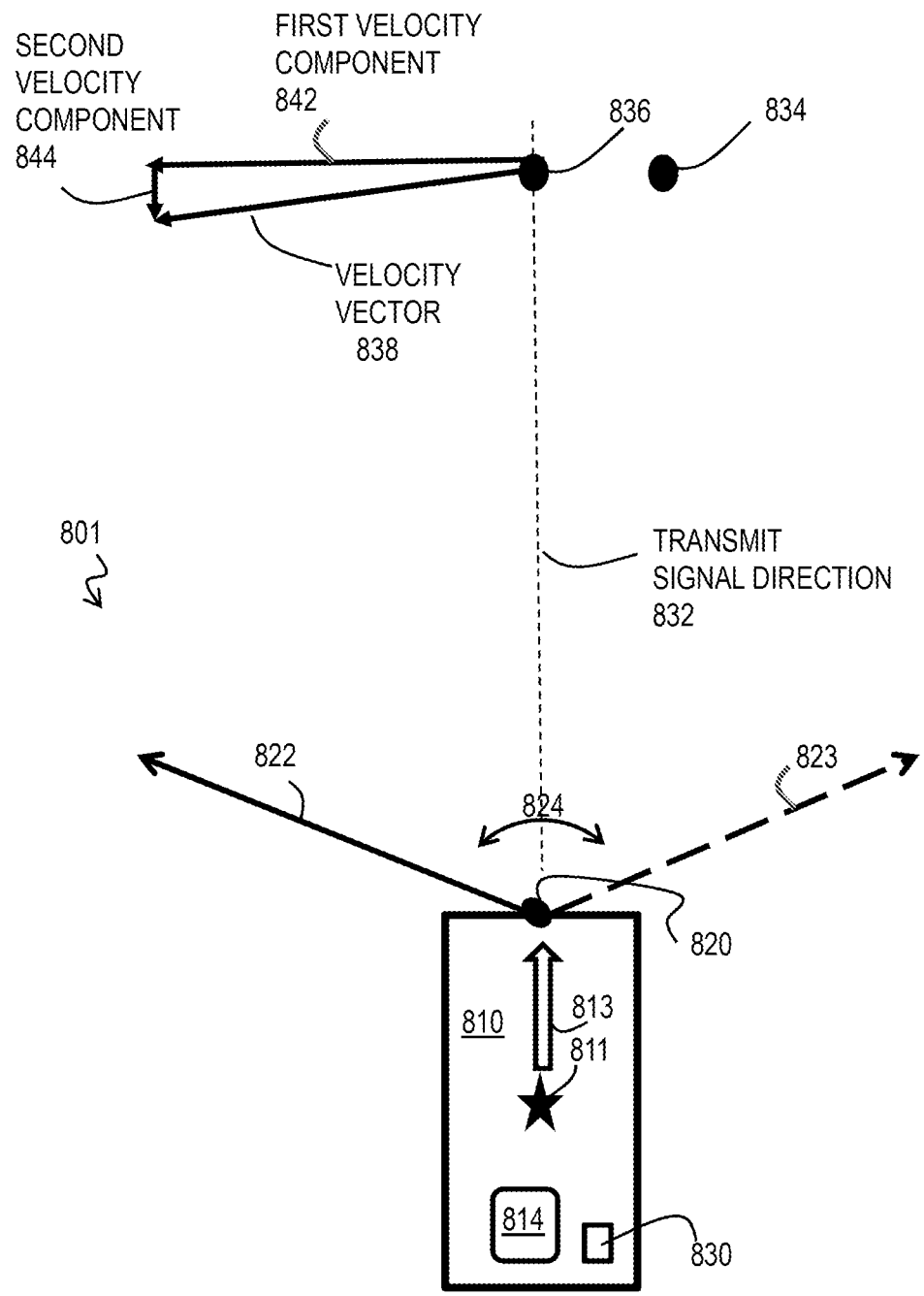
FIG. 8 is a block diagram that illustrates an example system 801 that includes at least one hi-res Doppler LIDAR system 820 mounted on a vehicle 810, according to an implementation.
Figure 12:
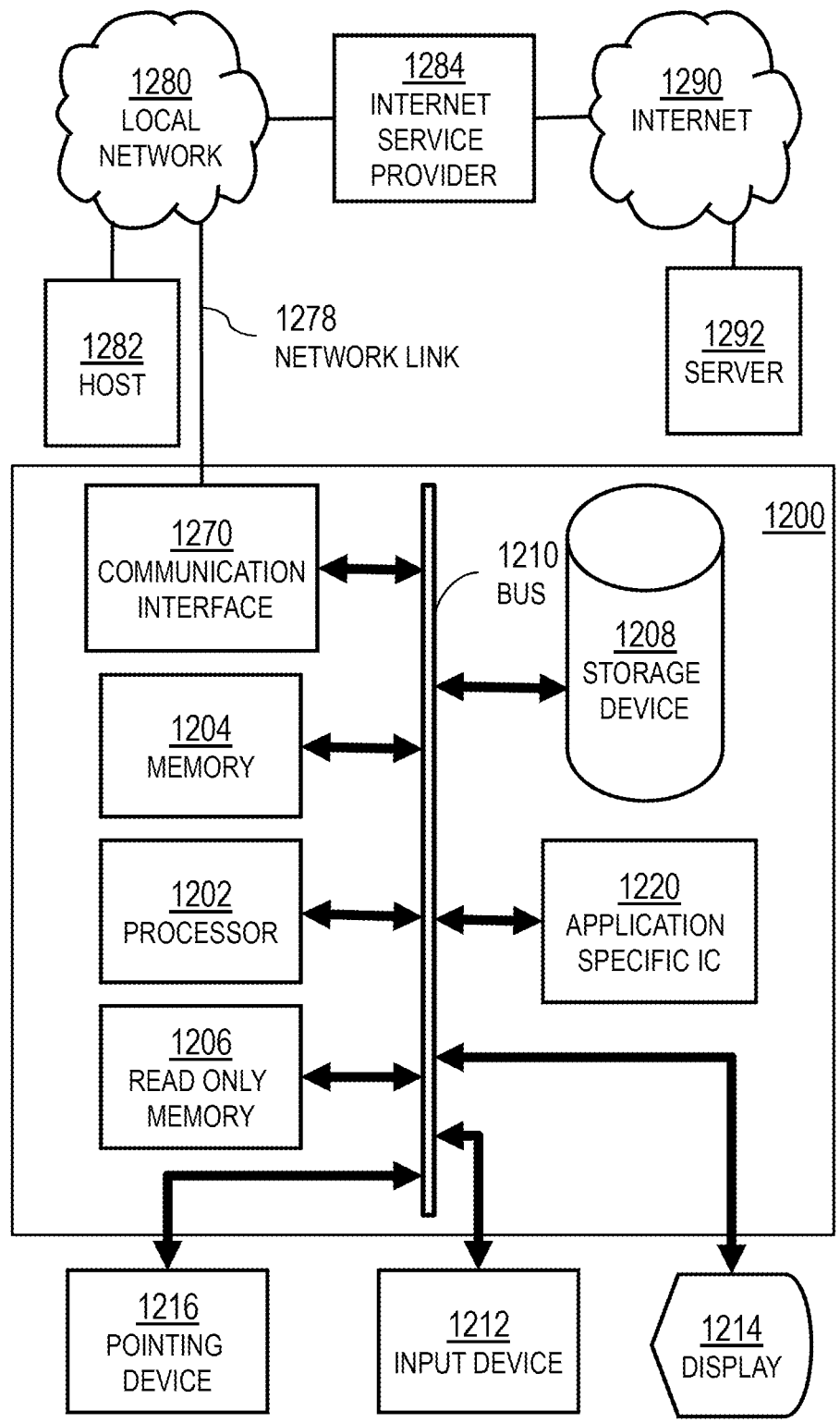
FIG. 12 is a block diagram that illustrates a computer system upon which an implementation of the disclosure may be implemented.

FIG. 8 is a block diagram that illustrates an example system 801 that includes at least one hi-res Doppler LIDAR system 820 mounted on a vehicle 810, according to an implementation. In an implementation, the LIDAR system 820 is similar to one of the LIDAR systems 200, 200'. The vehicle has a center of mass indicted by a star 811 and travels in a forward direction given by arrow 813. In some implementations, the vehicle 810 includes a component, such as a steering or braking system (not shown), operated in response to a signal from a processor, such as the vehicle control module 272 of the processing system 250. In some implementations the vehicle has an on-board processor 814, such as chip set depicted in FIG. 13. In some implementations, the on-board processor 814 is in wired or wireless communication with a remote processor, as depicted in FIG. 12. In an implementation, the processing system 250 of the LIDAR system is communicatively coupled with the on-board processor 814 or the processing system 250 of the LIDAR is used to perform the operations of the on board processor 814 so that the vehicle control module 272 causes the processing system 250 to transmit one or more signals to the steering or braking system of the vehicle to control the direction and speed of the vehicle. The hi-res Doppler LIDAR uses a scanning beam 822 that sweeps from one side to another side, represented by future beam 823, through an azimuthal field of view 824, as well as through vertical angles illuminating spots in the surroundings of vehicle 810. In some implementations, the field of view is 360 degrees of azimuth. In some implementations the inclination angle field of view is from about +10 degrees to about −10 degrees or a subset thereof.

In some implementations, the vehicle includes ancillary sensors (not shown), such as a GPS sensor, odometer, tachometer, temperature sensor, vacuum sensor, electrical voltage or current sensors, among others well known in the art. In some implementations, a gyroscope 330 is included to provide rotation information.

In these example implementations, the LIDAR system used components illustrated above to produce phase-encoded optical transmitted signals. In these implementations, the symbol time (pulse width) was 2 nanoseconds (ns, 1 ns=$10^{-9}$ seconds), the number of symbols per block, N, was 2048 and the number of blocks, M, was 5. A variety of targets at ranges from about 0 to about 250 meters were used and illuminated with a beam spot size from about 5 to about 20 mm in diameter.

In various implementations, the desired type of target identification, spatial resolution and accuracy, and object speed resolution and accuracy are used to select values for one or more parameters of the systems described above. Such parameters include one or more of code length, code block length, number of code blocks for averaging, the code itself (looking into engineered codes), shift between signal and code for better detection at long range, optimizations for speed, data acquisition rate, depth of phase modulation, transmitted laser power, laser spot size, scanning method and scan pattern.

4.1 Enhanced Velocity Resolution in Vehicle Setting

As described above, the CPI (duration of one block) limits the frequency resolution of the measurement to 1/CPI and ultimately limits the resolution of Doppler frequencies and corresponding velocity measurements of the LIDAR system. Practically, this may limit the ability of the sensor to detect motion of slow-moving targets (such as pedestrians) versus static targets (such as telephone poles). The situation is exacerbated when a slow-moving target is progressing perpendicular to the sensor's line of sight such that the radial component of the motion is further limited. For a 3.1 µs CPI the frequency resolution is 323 kHz (=1/CPI), which for a 1550 nm LIDAR system (192.5 THz carrier frequency) corresponds to a velocity resolution of about 0.25 meters per second (m/s) using Equation 2. Note that 3.1 µs CPI is an actual operating point for an experimental implementation. Thus, if the Doppler shift is computed over two blocks, the duration is 6.2 µs, the frequency resolution is finer at 161 kHz, and the velocity resolution would be finer, at about 0.12 m/s; thus, allowing one to distinguish a slower moving object, such as a pedestrian walking near perpendicular to the line of sight from the LIDAR, from a stationary object.

For a scanned beam LIDAR system, the practical upper limit of such an extension of Doppler computation duration may be the translation of the scanned beam across multiple speckle realizations of the same object. This will cause phase evolution that may ultimately limit the resolution improvements. The Doppler broadening compensation described in more detail below with reference to section 4.5, addresses possible remedies to this limitation.

The extension of Doppler computation duration (first duration) to multiple CPI for velocity resolution purposes may be changed dynamically depending on the speed of the vehicle operating the LIDAR system or the look angle of the beam at the time of measurement or other operator concerns. For example, a vehicle in dense urban traffic may need better pedestrian detection capabilities via finer velocity resolution to safely navigate. Or certain areas of the field of view, such as in front of the vehicle, may benefit from finer velocity resolution more than areas to the side of the vehicle. Overall this method contributes to the information advantageous to successfully operate an autonomous vehicle safely. The choice of resource utilization would be exposed to the operator of the LIDAR system.

For example, in FIG. 8 a stationary object 834 such as a lamp post is advantageously distinguished from a slowly moving object 836, such as a pedestrian. If the pedestrian is moving in direction given by velocity vector 838, there is first velocity component 842 that is perpendicular to the line of sight from the LIDAR system and thus does not provide a Doppler shift; and, there is a second velocity component 844 directed toward the line of sight form the LIDAR system and thus does contribute to a Doppler shift. If the second component is very small, as shown in FIG. 8, it may be difficult to distinguish the moving object 836 from the stationary object 834. The enhanced velocity resolution described in this section is extremely useful in such circumstances.

4.2 Coherent Filtering

As described above, spurious returns can be eliminated by considering the phase expected at each range based on the observed Doppler shift. The expected phase, $\phi_E$, for a range bin associated with a travel time of $\Delta t$ and Doppler shift of $\Delta f_D$ is given by Equation 16a.

$$\phi E = \text{angle}\{\exp(i2\pi \Delta f_D \Delta t)\} \tag{16a}$$

This factor can be used to accentuate the real peaks and diminish the noisy variations by further correcting the complex cross correlation with this phase as given in Equation 16b to rotate the cross correlation terms with the expected phase so they are directed along the positive real axis.

$$XC\text{corr} = XC/\exp(i\phi_E)\} \tag{16b}$$

Figure 6A:
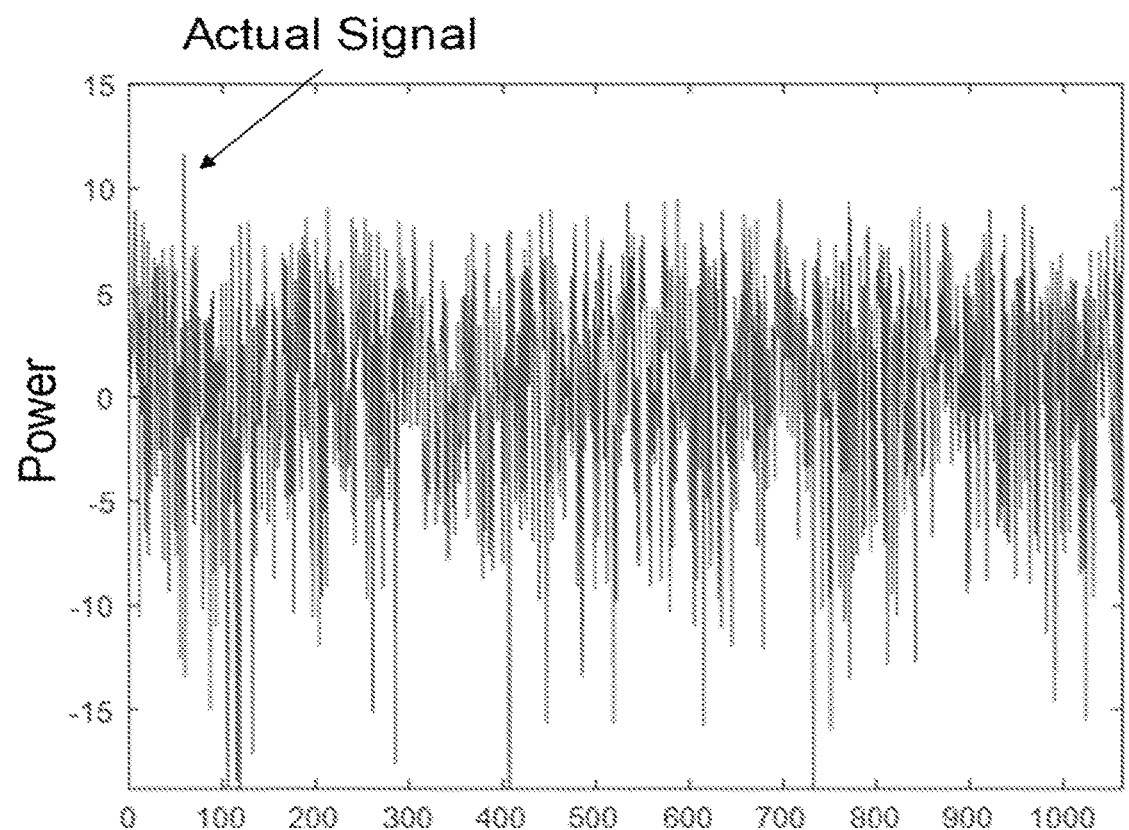
FIG. 6A is a range profile that shows an actual range peak barely distinguished in terms of power from noise bins at farther ranges, according to an implementation.
Figure 6B:
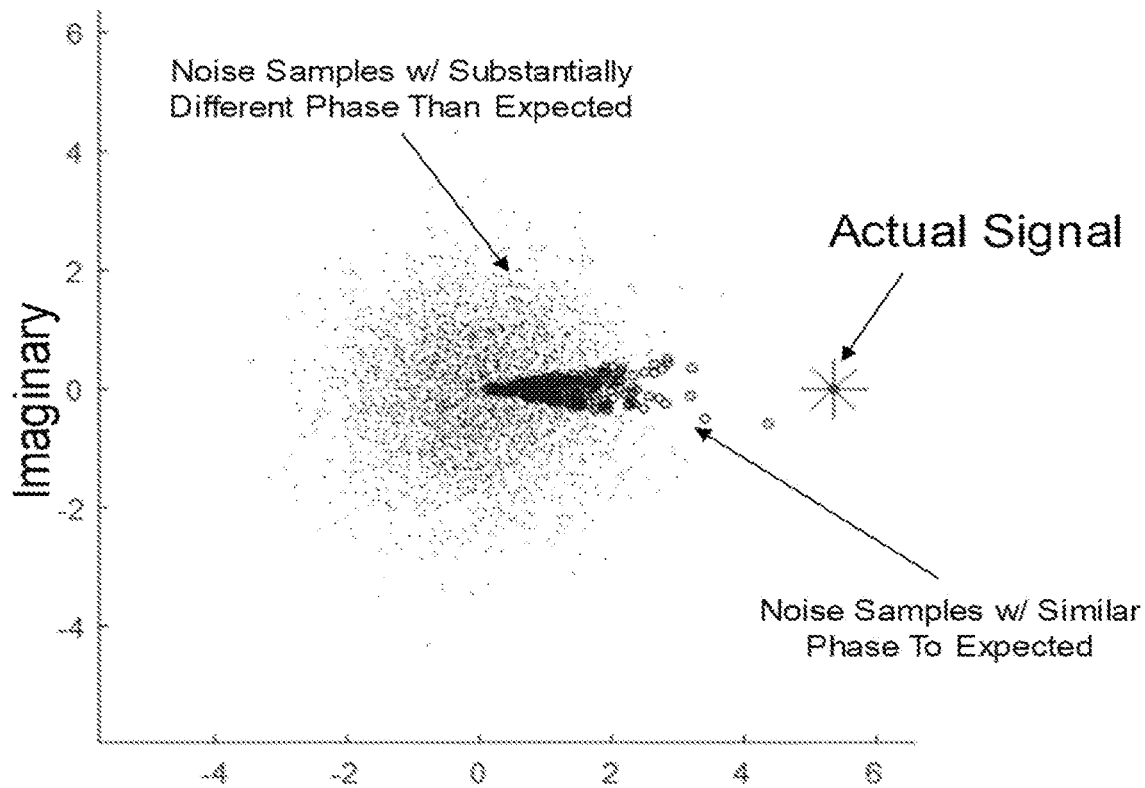
FIG. 6B is graph of real and imaginary parts of the return signal, the argument of FFT in Equation 16b, according to an implementation.

This approach has the effect of improving the detection statistics because the number of noise bins contributing to possible false alarms is limited by the additional analysis of available phase information. The effect is illustrated in FIG. 6A and FIG. 6B. FIG. 6A is a range profile that shows an actual range peak barely distinguished in terms of power from noise bins at farther ranges, according to an implementation. The horizontal axis indicates range bin and the vertical axis indicates power in dB. The actual signal is marked at about range bin 60. Plotting the complex amplitudes of the various bins demonstrates better separation between the noise and signal, especially when limiting the samples under consideration to a specific phase. FIG. 6B is graph of real and imaginary parts of the cross correlation in Equation 16b, according to an implementation. Returns with phase similar to the expected phase of Equation 16a are directed along the positive real axis, and are marked by open circles if within a few degrees of zero. Other returns are simple dots. The graph shows that a large number of returns range bins are easily eliminated, making detection of the actual signal easier to identify.

4.3 Signed Doppler from Coherent Filtering

As described above, if the sign of the Doppler shift is not known, then, in additions to or instead of filtering the returns based on the expected phase shift, the sign of the Doppler shift can be determined based on the compensated phase in each range bin and the measured magnitude of the Doppler shift. The phase compensation $\phi_{comp}$ for the range peak is the complex conjugate of $\phi_E$. The phase compensated complex value(s) of the range peaks are plotted in FIG. 7.

FIG. 7 was collected under different conditions at about an SNR of 22 dB. Each experimental data set consists of 8000 range measurements off a diffuse rapidly spinning target oriented at an angle to the beam to sample a speckle distribution and provide a Doppler shift. Doing this, it was found that the blue shifted Doppler signals result in a phase of the range peak that is mostly oriented along the positive imaginary axis, red shifted Doppler signals result in phase along the negative imaginary axis, and signals at DC result in a phase along the real axis. This last result is a consequence of the facts that the signal and the code that we being correlated are both real signals; so, if no Doppler shift is applied, then the resulting correlation must be real valued also. This phase correlation allows determination of the sign of the Doppler frequency shift from the phase of the resulting range. The compensation is made assuming a positive Doppler shift, for example. If the assumption is correct the phase of the range peak is found along the positive imaginary axis. If the assumption is wrong, then the range peak is found along the negative imaginary axis; and the sign of the Doppler shift is determined to be negative, accordingly.

This technique works exceedingly well for high SNR and Doppler shifts more than 2 frequency resolution bins away from DC. For smaller SNR and Doppler frequency shifts close to DC the distribution of the phase is less consistent, so small Doppler shifts may remain unsigned using this technique. In such circumstances, the two separate measurements of in-phase and quadrature electrical signals can be used instead.

4.4 Digitally Compensating for Laser Linewidth Issues

Figure 9A:
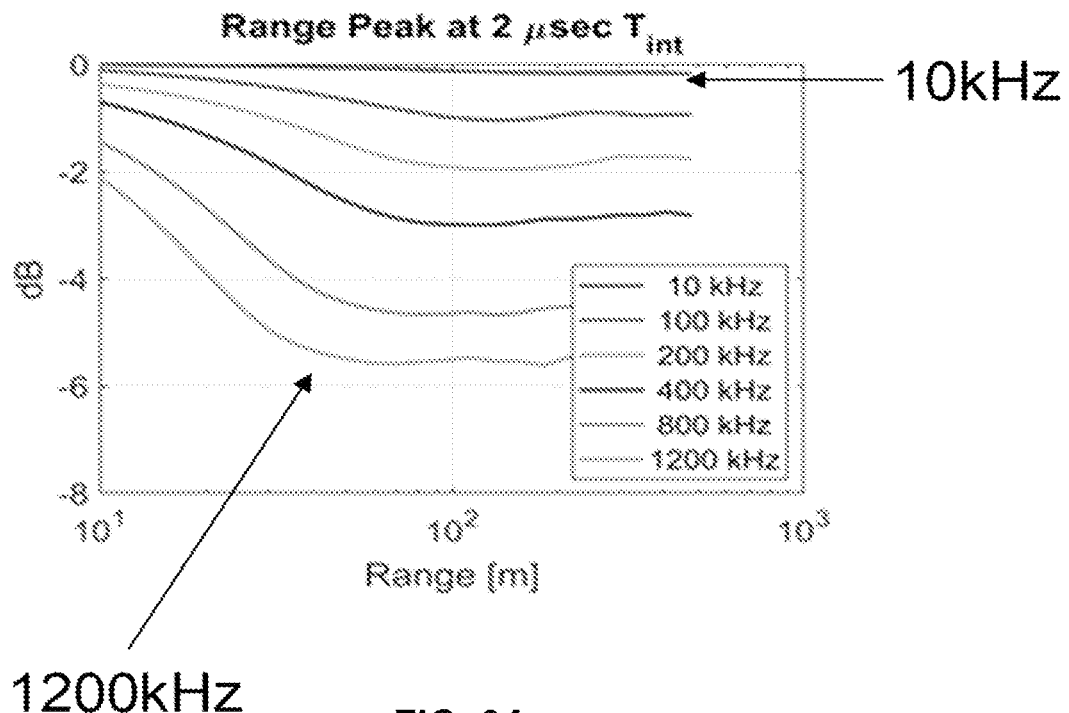
FIG. 9A and FIG. 9B are graphs that illustrate reduction of SNR due to laser linewidth with range and sampling rate for two different coherent processing intervals, 2 μs and 3 μs, respectively, without compensation, according to an implementation.
Figure 9B:
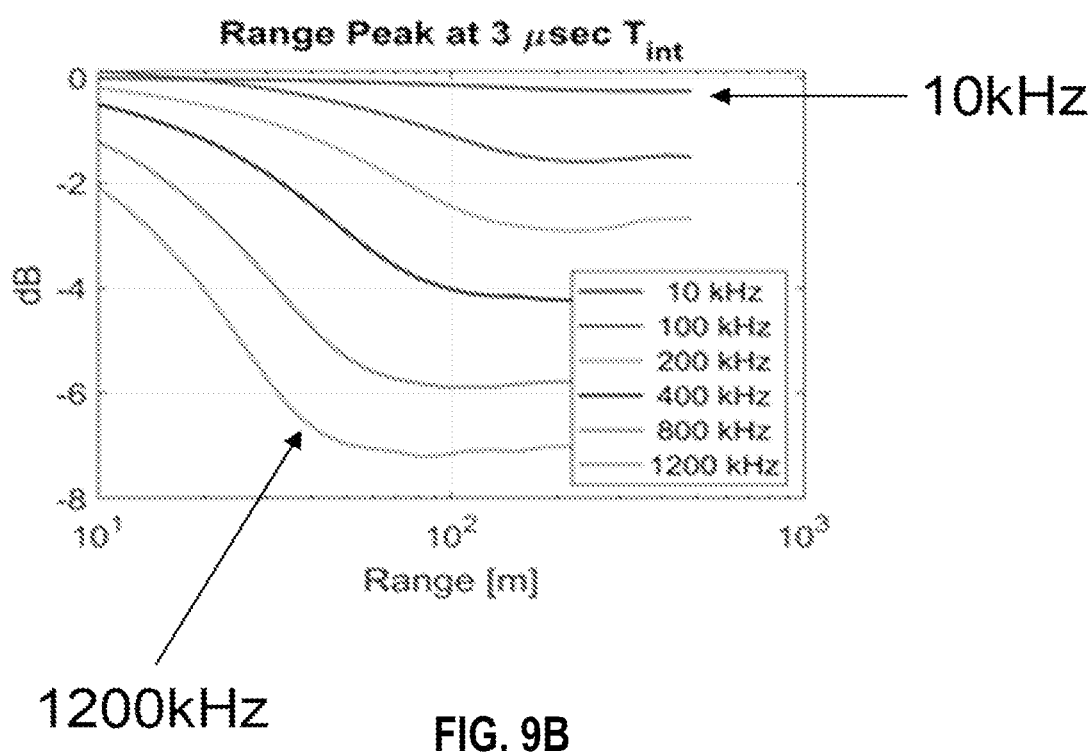

Laser linewidth is a critical performance parameter in the system design of a coherent LIDAR system. Time (range) delay between the transmit and local oscillator signals and coherent processing interval both lead to signal to noise degradation that depends on linewidth. Monte Carlo simulations across this trade-off space demonstrate the expected SNR loss due to imperfect laser linewidth. The phase wander of the laser over timescales on the order of the coherent measurement (e.g., $M*N*\tau+\Delta t$) leads to decoherence between the local oscillator and the time delayed returned optical signal $R(t)=R_I+iR_Q$. Ultimately, this upsets the coherent processing gain attainable with the signal and negatively impacts the SNR, i.e., reduces the SNR. FIG. 9A and FIG. 9B are graphs that illustrate reduction of SNR due to laser linewidth with range and sampling rate for two different coherent processing intervals, 2 μs and 3 μs, respectively, without compensation, according to an implementation. The horizontal axis indicates range bin, the vertical axis indicated SNR reduction compared to a perfect laser source having negligible linewidth, and different traces indicate different sampling rates from 10 kiloHertz (kHz, 1 kHz=$10^3$ samples per second), where each sample represents M*N symbols of total duration D=M*N*$\tau$, and, CPI=N*$\tau$. SNR is reduced even faster for the longer CPI (larger $\tau$) due to increased linewidth drift during the longer time interval.

The evolution of the laser frequency and phase detected in the internal reflection signal $S_p(t)$, described above, with reference to Equation 11b, are here used to digitally compensate the real or complex electrical signal S(t) before further processing in determining the cross correlation. An inner product operation between the reference phase code B(t) and a temporally aligned segment of the time domain signal $S_p(t)$, or subsections thereof, such as one or more blocks, produces the amplitude A(t) and phase $\phi(t)$ at that time delay for the processed duration, as given by Equation 17a and Equation 17b.

$$A(t) = \frac{1}{np}\left\{\sum_{t=t1}^{t2} S_p(t) * B(t)\right\}, \tag{17a}$$

$$\phi(t) = \text{angle } \{A(t)\} \tag{17b}$$

Where np is the number of discrete samples in the time interval form t1 to t2.

Performing this measurement over time allows for the evolving phase $\phi(t)$ of the laser to be tracked. Knowledge of the range delay to the internal circulation optics ($\Delta t_I$) allows for the phase evolution $\phi(t)$ to be converted into the frequency drift of the laser ($\Delta f_L$), as given by Equation 18a.

$$\Delta f_L = \Delta\phi/\Delta t_I \tag{18a}$$

To have a value at each time step, the slowly evolving drift detected over several samples is up-sampled to the digitizer rate of the LIDAR system. The phase/frequency evolution of the laser is slower that the baud rate, but faster than N*$\tau$, so these corrections happen on such time scales.

One correction is a range-independent phase correction to the local oscillator, called herein an LO correction. In this case, the time domain signal vector S(t) is elementwise multiplied by the complex LO correction as given by Equation 18b.

$$S'(t)=S(t)*\exp(-i\phi(t)) \tag{18b}$$

A second correction is a range-dependent phase correction to mitigate SNR loss in a particular range interval of interest, represented by a central range bin at delay time $\Delta t_C$. In this case, the time domain signal vector S(t) is elementwise multiplied by the range dependent correction as given by Equation 18c.

$$S'(t)=S(t)*\exp(-i2\pi f(t-\Delta t_C)\Delta t_C) \tag{18c}$$

Where $f(t-\Delta t_C)$ is the frequency evolution derived using Equation 8a and temporally shifted by $\Delta t_C$. Given that the measured temporal evolution is coarsely determined over multiple spots, the time delay introduced by equation 18c is expected to be valid over a reasonable interval of range bins.

Figure 10A:
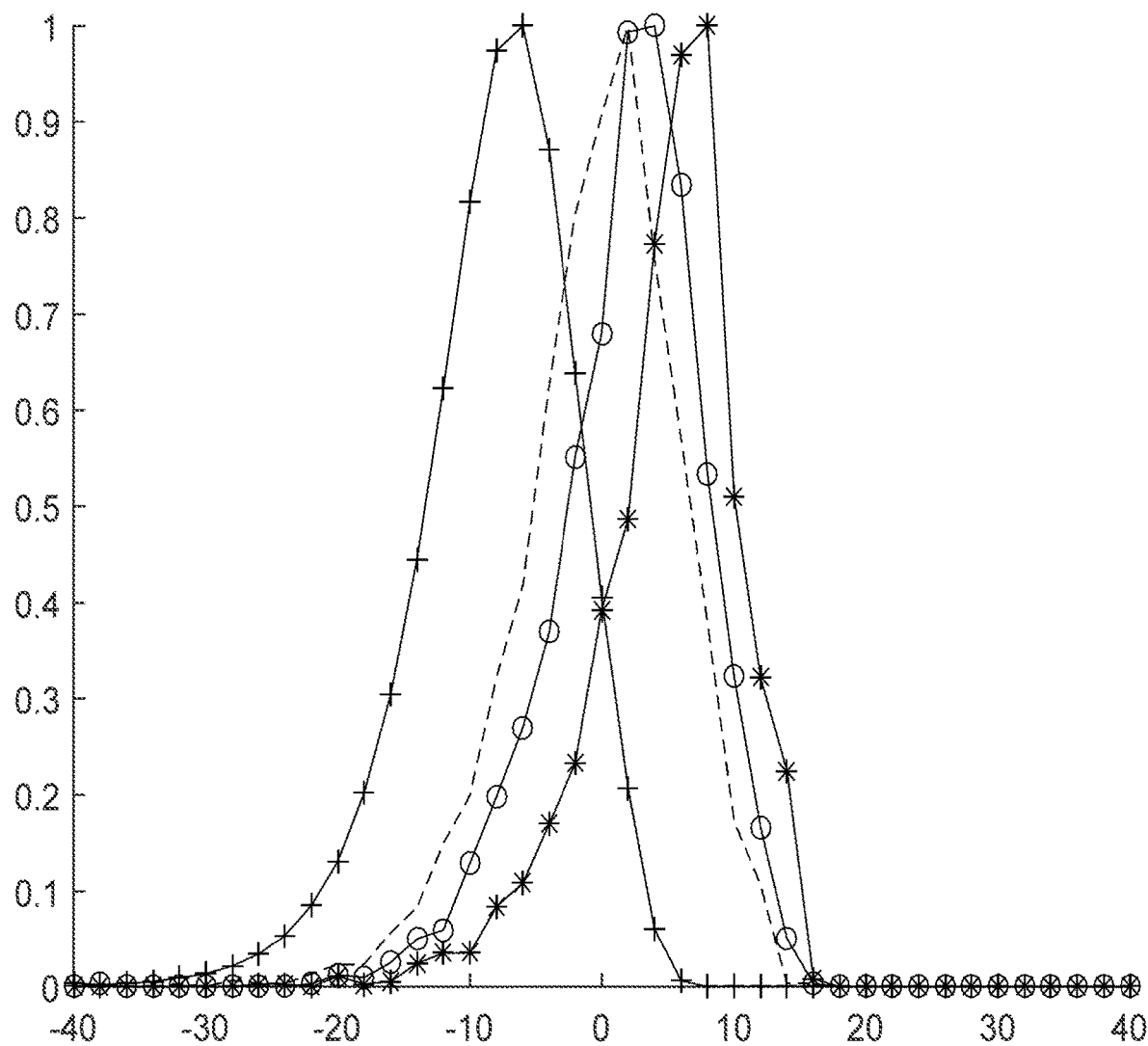
FIG. 10A is a graph that illustrates example distributions of signal and noise in simulated data applying linewidth various corrections, according to various implementations.

Both techniques were applied to demonstrate SNR recovery in measurements employing lasers with sub-optimal linewidth of about 800 kHz. The recovery is consistent with expected SNR loss due to the linewidth spread—about 5 dB of SNR improvement. This is shown in FIG. 10 through FIG. 10C. FIG. 10A is a graph that illustrates example distributions of signal and noise in experimental data applying various linewidth corrections, according to various implementations. The horizontal axis indicates power in dB relative to the power in a range peak with neither linewidth correction applied; and, the vertical axis indicates number of bins with the observed power level, normalized to the maximum number of bins for any power level. The trace labeled with + symbols corresponds to a section of bins with only noise. The most common power is about −10 dB relative to an uncorrected range peak. The dashed trace corresponds to a section of bins with signal but no corrections applied. The most common power is about 0 dB as expected by definition. The trace labeled with open circles corresponds to a section of bins with only the LO range-independent correction applied. The most common power is about +3 dB relative to an uncorrected range peak, a SNR recovery of 3 dB. The trace labeled with asterisks corresponds to a section of bins with both the LO range-independent correction and the range-dependent correction applied. The most common power is about +8 dB relative to an uncorrected range peak, a SNR recovery of 8 dB. This latter asterisk trace clearly shows the best delineation from the noise distribution.

Figure 10B:
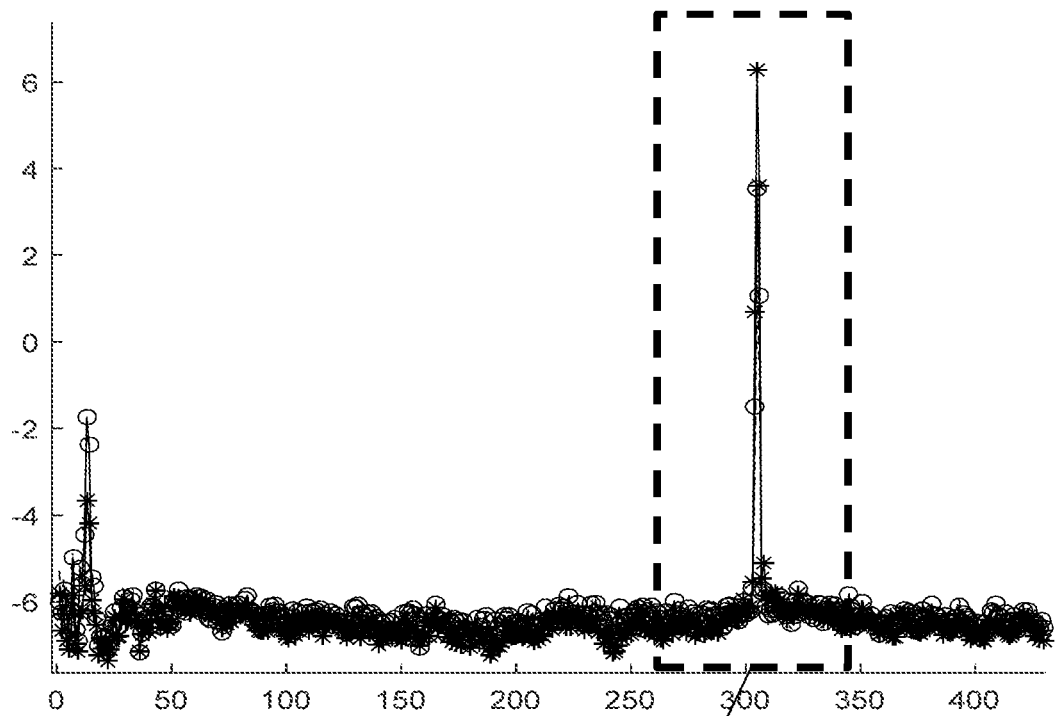
FIG. 10B and FIG. 10C are graphs that illustrate example range peaks in actual return data applying various linewidth corrections, according to various implementations.
Figure 10C:
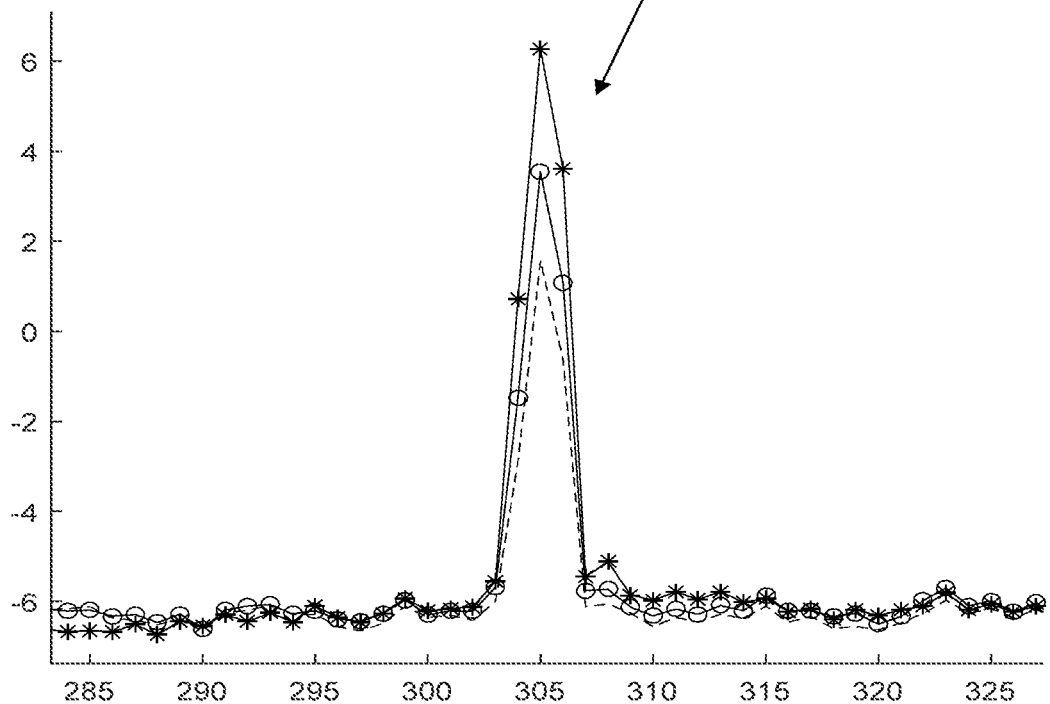

FIG. 10B and FIG. 10C are graphs that illustrate example range peaks in actual return data applying various linewidth corrections, according to various implementations. The horizontal axis in each indicates range bin; and, the vertical axis in each indicates power in dB relative to an arbitrary level. FIG. 10C is a zoomed in version of FIG. 10B to better distinguish the traces plotted. The dashed trace corresponds to the actual returned signal with no corrections applied. A peak is observed with a power of about 1 dB. The trace labeled with open circles corresponds to the actual returned signal with only a range-independent LO correction applied. A peak is observed with a power of about 3 dB. The trace labeled with asterisks corresponds to the actual returned signal with both a range-independent LO correction and a range-dependent correction applied. A peak is observed with a power over 6 dB. Clearly, the fully corrected signal has the best SNR, which can be especially useful for distant targets or noise conditions.

4.5 Digitally Compensating for Doppler Frequency Broadening

Coherence broadening in the Doppler domain appears as energy from one target in multiple adjacent frequency bins during the computation of Doppler shift. This can lead to error in the Doppler shift peak determination, which then leads to error in the cross correlation and resulting peak range bin.

Coherence broadening occurs due to continuous phase and frequency fluctuations with evolution on the order of the coherent processing interval (CPI) of the phase coded LIDAR pulse train. These phase and frequency fluctuations can come from a number of different sources including laser phase noise, platform and target vibrations, and speckle evolution. Speckle refers to the random amplitude and phase of a coherent return due to the contribution of a large number of individually phased returns from a diffuse target within a diffraction limited divergence angle. The diffraction limited divergence angle is the minimum divergence possible for a given collimated Gaussian beam diameter—that is, it is not physically possible to do better than the diffraction limited divergence angle, $\theta_D = \lambda/\pi w$ where $\lambda$ is the laser frequency, and w is the Gaussian beam parameter (1/(beam radius $e^2$)) of the collimated beam. Speckle evolution occurs when the contribution of those scatterers change due to beam and/or target motion. Speckle evolution is an issue in coherent beam scanning LIDAR, which can limit the scanning speed to a value on the order one diffraction limited divergence angle per CPI, or otherwise suffer significant loss of range peak SNR. Digitally compensating for such coherence broadening enables increased speed of beam scanning for a given target maximum range, which allows faster update rates for the coherent beam scanning LIDAR system.

To explain the compensation, the following is provided as justification. However, the method is not subject to the completeness or accuracy of the following. In coherent LIDAR, the phase of the measured signal is interferometrically sensitive to the distance, L, between the scattering target and the LIDAR system by Equation 19a.

$$\varphi = 4\pi L/\lambda \tag{19a}$$

where $\lambda$ is the wavelength of the optical carrier. Even micron scale movements lead to phase shifts and larger scale movements lead to Doppler shifts. For diffuse targets interferometric sensitivity leads to speckle distributions (e.g., multiple returns) of the received field including phase variations. For near diffraction limited collimated laser beams, the scale of the speckle distribution can be parametrized by the diffraction limited divergence angle of the laser beam. Here, "scale" means the amount of angular scanning displacement required to induce a new speckle realization or appreciable change in phase and amplitude, or both. It is a normalized parameter of scanning speed relative to beam size (bean divergence angle, $\theta_B$, limited by diffraction-limited divergence angle $\theta_D$) and coherent processing interval (CPI), and is expressed, for example, in units of degrees per second. This relationship is expressed in Equation 19b.

$$\text{scale} = \theta_B/\text{CPI} \tag{19b}$$

In a coherent beam scanning LIDAR, rapidly scanning more than this angle in a single coherent processing interval (CPI, e.g., N*τ) leads to phase broadening of the signal. Phase broadening leads to reduced signal after cross-correlation processing.

The processing approach described here partially compensates for the phase broadening by utilizing the Doppler domain signal (frequency) broadening as an estimate of the phase evolution broadening during the coherent processing interval.

Recall as described above that the core processing block begins with digitized and conditioned time domain data partitioned into array vectors, S'(t) at the repetition period of the transmitted code (N*τ). For each time domain vector an FFT is applied to S'(t), e.g., in Equation 12, transforming the signal into the frequency domain where the Doppler signal is identified as a peak in the power spectrum or cross spectrum XS(S). The location of the peak in frequency space, n, identifies the Doppler frequency of a potential target, and the power of the peak is proportional to the return signal. Cross-correlation of the signal with phase code, $B_m(t)$ is implemented in equation 15c by multiplying the FFT of the signal, (e.g., $S_{FFT}$) by the conjugate of the FFT of the phase code that has been circularly shifted to align the DC frequency value to the Doppler frequency of the signal. In other implementations, other versions of the multiplication are performed, e.g., as illustrated in Equation 15a or 15b. After multiplication, an inverse FFT is applied to calculate the cross-correlation of the time domain signal against the frequency shifted code producing a complete range profile for that Doppler compensation and signal data vector. This process is repeated every transmit/receive interval (N*τ). In some implementations, with M>1, the results of M such computations are averaged.

According to the illustrated implementation, the Doppler compensated cross-correlation of the signal with the phase code is repeated K times, each time by applying the multiplication of the Doppler compensated signal with shifted, scaled, and phased versions of the FFT of the code $B_m(t)$. These results are then coherently summed before the inverse FFT is performed to calculate the range-profile compensated for Doppler broadening. It is important to note that this method is not equivalent to compensating for different Doppler targets. For this Doppler broadened compensation technique to improve the SNR of a target signal in the range domain, the Doppler compensations is treated collectively as a single signal from a single target. The selection of shifts, scaling, and phases can cause either constructive interference or destructive interference of the range peak.

Figure 11A:
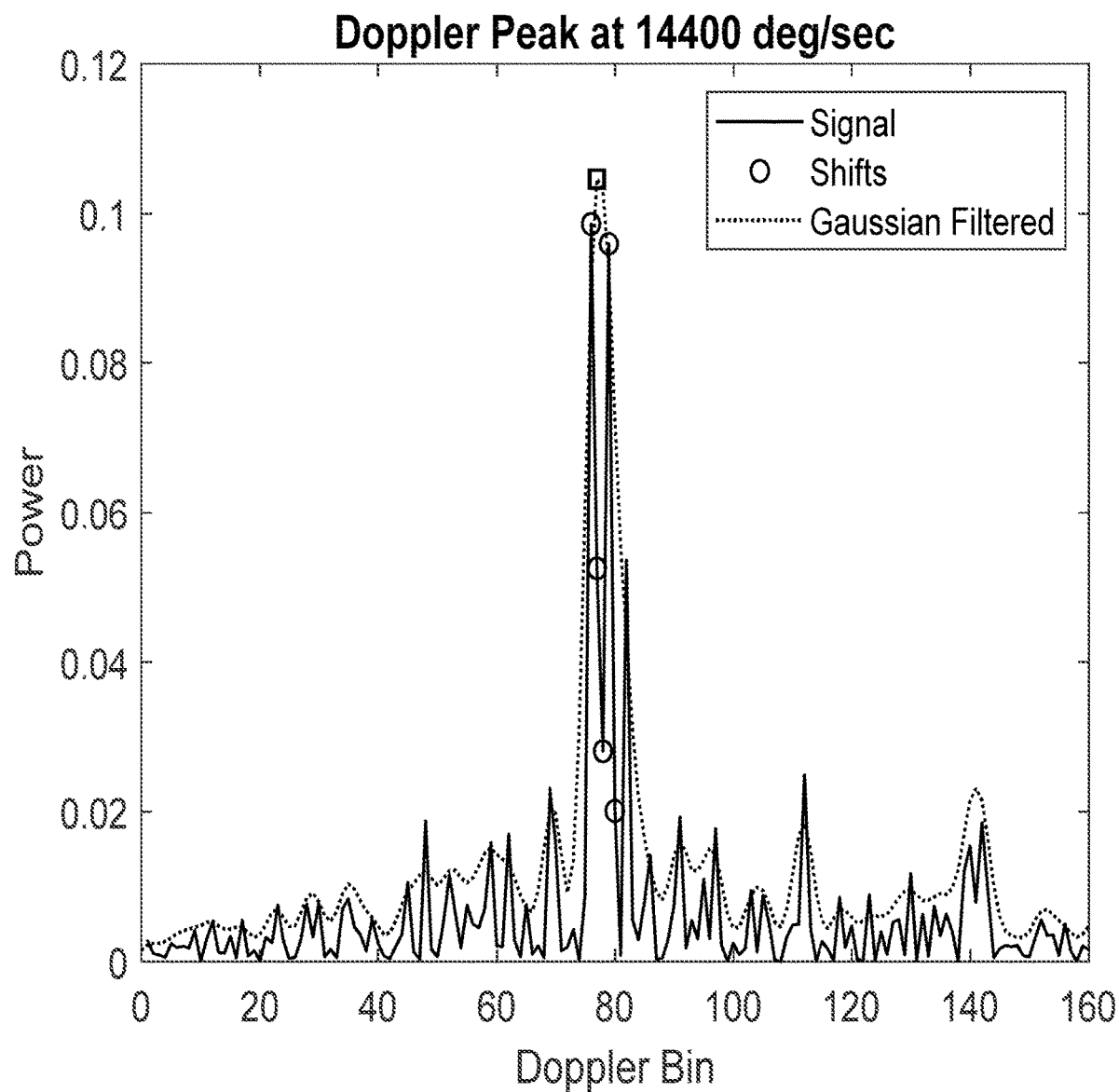
FIG. 11A and FIG. 11B are spectral plots that illustrate example effects of frequency broadening due to speckle on selection of the Doppler peak, for two different sampling rates, respectively, according to various implementations.
Figure 11B:
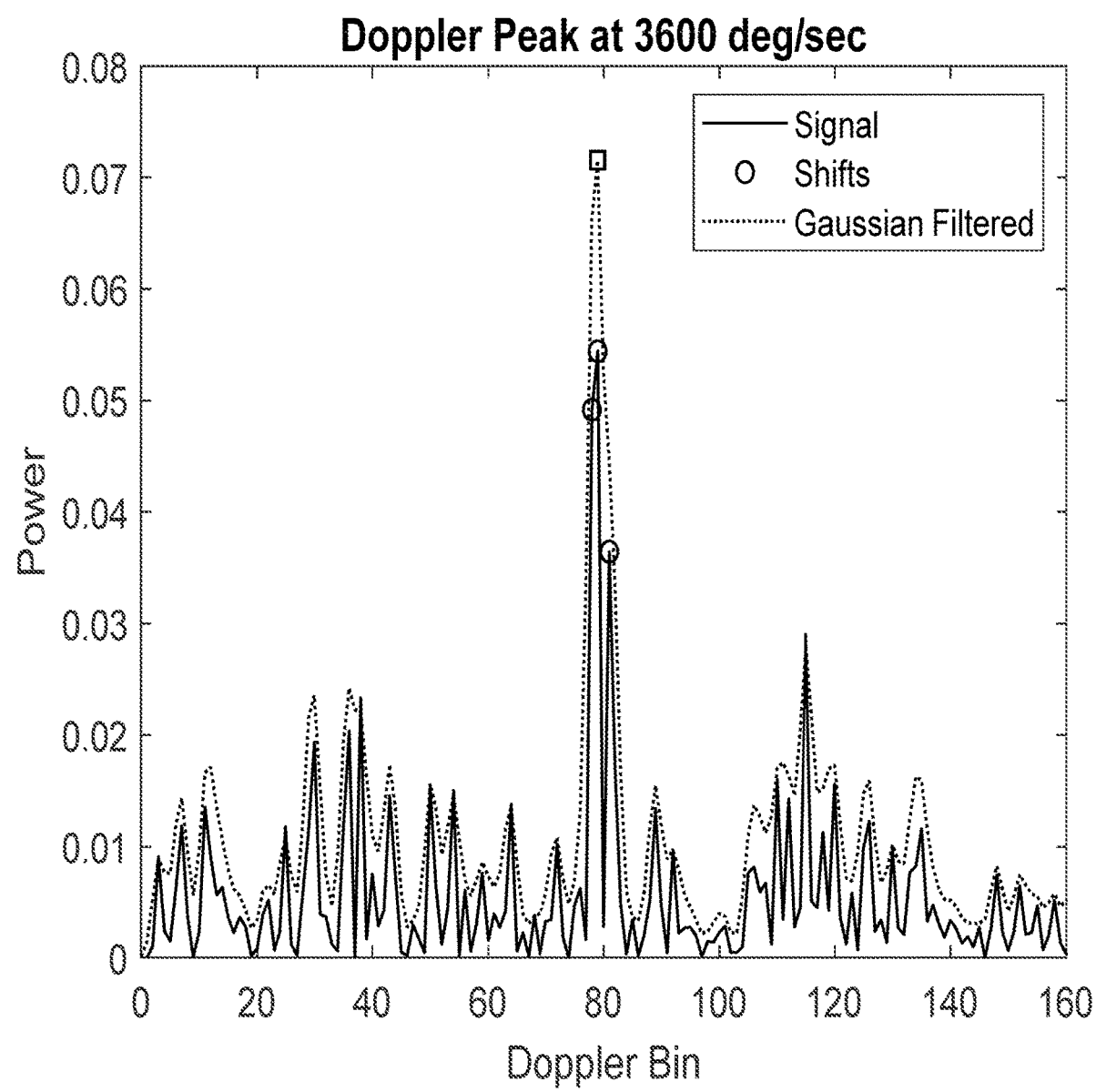

FIG. 11A and FIG. 11B are spectral plots that illustrate example effects of frequency broadening due to speckle on selection of the Doppler peak, for two different sampling rates, respectively, according to various implementations. The horizontal axis indicates spectral (frequency shift) bin and the vertical axis indicates power in dB relative to minimum observed power. The solid line is simulated data with rapid speckle evolution at a scan rate of 14,400 degrees per second in FIG. 11A and 3,360 degrees per second in FIG. 11B. For a beam of 100 microradian divergence, this corresponds to about 7.4 speckle cells in FIG. 11A and 1.8 speckle cells in FIG. 11B in a single 3 microsecond CPI, a used in many example implementations. The first consequence is that the peak height of the signal is reduced, which makes thresholding the Doppler signal amid the shot noise background noise more difficult. Secondly, the spread of energy among multiple Doppler bins means the code energy to be cross correlated is also shifted among more than one Doppler bin, so that a single Doppler compensation shift will not correlate perfectly, reducing the final SNR of the range peak. In each plot, two or three different peaks are evident due to coherence broadening caused by the simulated speckle evolution. The dashed line is a low-pass Gaussian filtered version of the same spectral signal. K=5 Doppler shifts, centered on the peak in the dashed trace (the low-pass version of the signal), are used for the digital compensation and indicated by open circles.

In general, to compensate for the Doppler broadening, the first step is to correctly identify the Doppler peak in the power spectrum from the shot noise background. In a preferred implementation a Finite Impulse Response (FIR) filter, G, is used to smooth the Doppler spectrum producing the dashed trace in each plot. This smoothing helps to integrate the energy over the speckle broadened peak to bring it above the fluctuations in the shot noise background. In a preferred implementation this filter is defined by a radius, r, which sets the number of taps in the filter to be 2r+1 and filter itself as the 1/e half-width of a Gaussian shape as √2r. After the filter is applied, the Doppler peak is evident as the bin n with the largest power in the dashed trace, provided it is in the Doppler region of interest that exceeds a threshold power level, e.g., the average background noise. Then the K largest points, at bins designated $n_k$, in the original signal (the solid trace) within radius, r, around bin n are chosen for Doppler compensation.

The Doppler broadened compensated cross-correlation range profile is then calculated according to Equation 20.

$$L_{SC} = XC(\text{Code}, S_{SC}) = \frac{1}{M}\sum_{m}^{M} invFFT\left[\sum_{k=1}^{K}\left\{\frac{iS(n_k)_{FFT}}{|S(n_1)_{FFT}|}FFT\exp(iB_m(t, n_k))\right\} * (S(n_k)_{FFT})\exp(-i2\pi\Delta f(n_k - n_1)\Delta tr)\right\} \right] \quad (20)$$

The fraction is a scaling factor and the exponential is a phase factor that accounts for the phase accumulated between different Doppler frequency bins spaced by $\Delta f$ and the reference round-trip time to the target and back, $\Delta t_r$, corresponding to reference distance $L_r$. This approach is similar to a deconvolution in the frequency domain, before the matched filter. The range dependent phase factor means that the effectiveness of the compensation algorithm depends on the choice of range to compensate around and the actual range. If the range to correct to is chosen poorly this will lead to degradation of the SNR of the range peak rather than an increase in final SNR. In LIDAR the SNR at shorter ranges is generally better than at long ranges so this suggests that if a single range is chosen to compensate it should be near the max expected range, as shorter ranges generally have sufficient SNR that some loss at these wavelengths can be suffered without major reduction of the probability of detection.

Figure 11C:
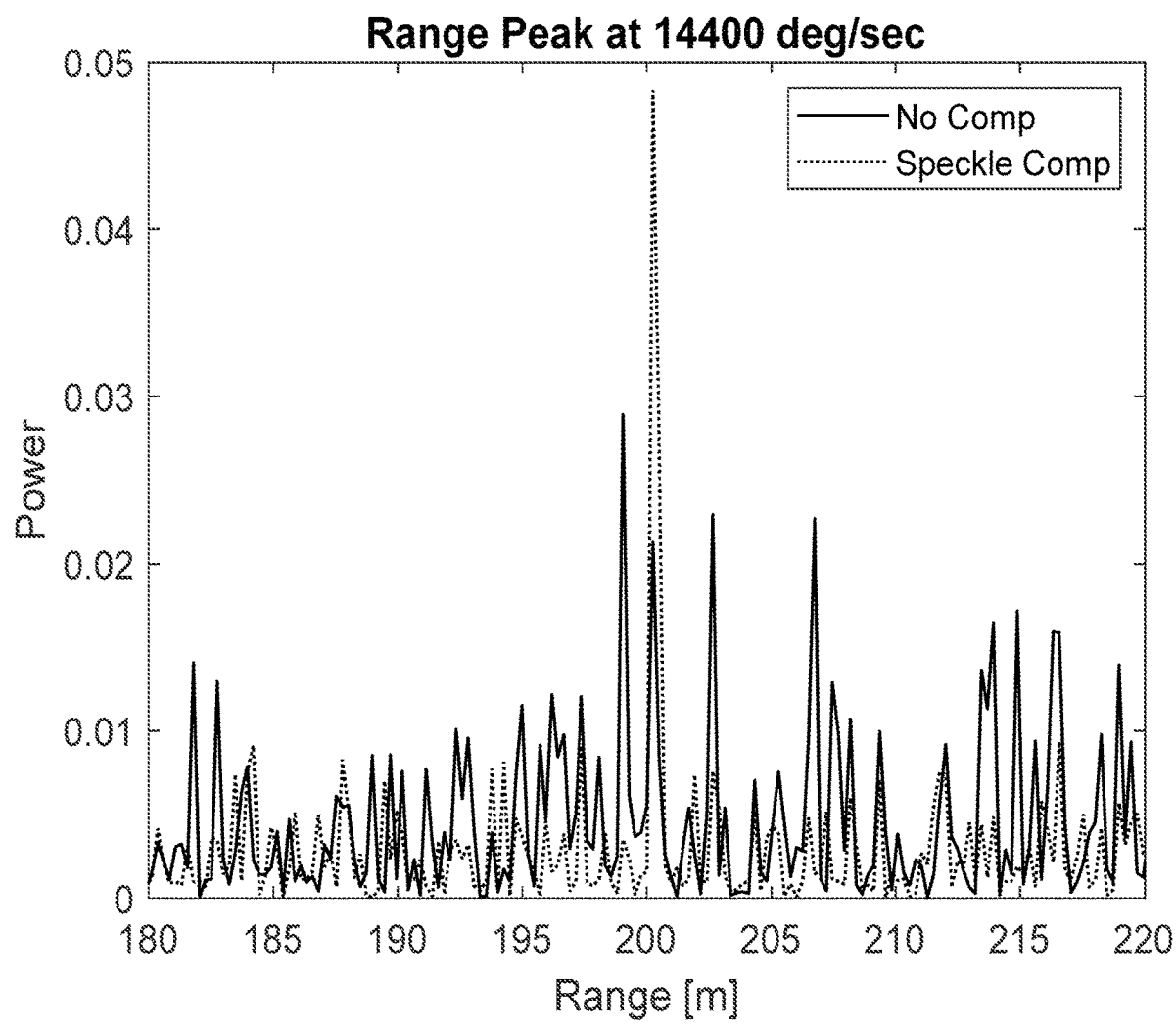
FIG. 11C and FIG. 11D are range plots that illustrate example effects of digital compensation for frequency broadening, for two different sampling rates, respectively, according to various implementations.
Figure 11D:
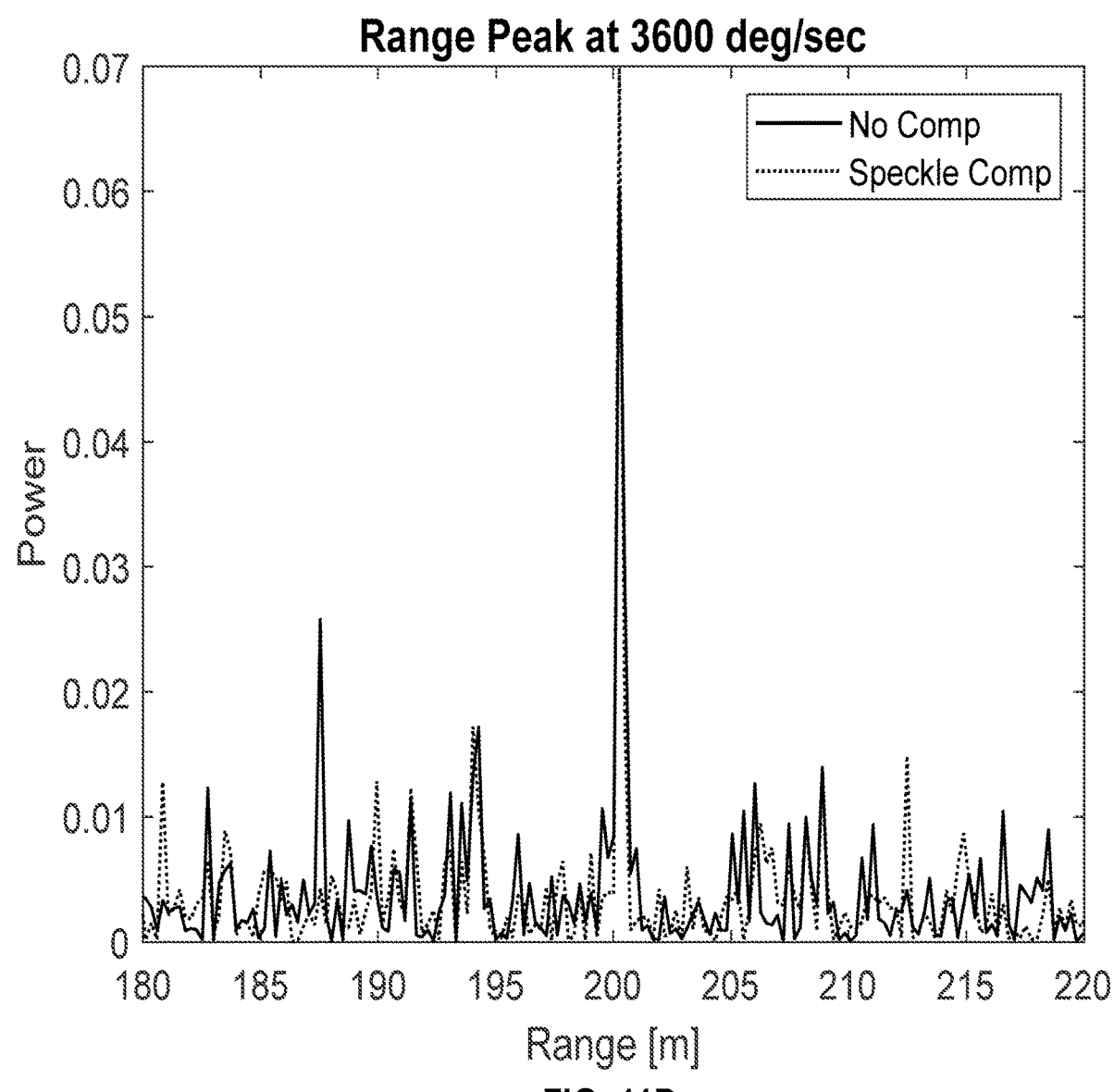

FIG. 11C and FIG. 11D are range plots that illustrate example effects of digital compensation for frequency broadening, for two different sampling rates, respectively, according to various implementations. The horizontal axis indicates range bin (L) in meter and the vertical axis indicates power in arbitrary units on a linear scale. The original range profile is indicated by the solid trace; and the range profile after compensation for the coherence broadening caused by the simulated speckle is indicated by the dashed trace in each plot, with FIG. 11C corresponding to the simulated data in FIG. 11A, and FIG. 11D corresponding to the simulated data in FIG. 11B. For each scanning rate, the compensated range profile shows a substantially stronger peak at 200 m. For the higher scanning rate of FIG. 11C, the compensation may provide the difference between missing and detecting the target at 200 m.

Figure 11E:
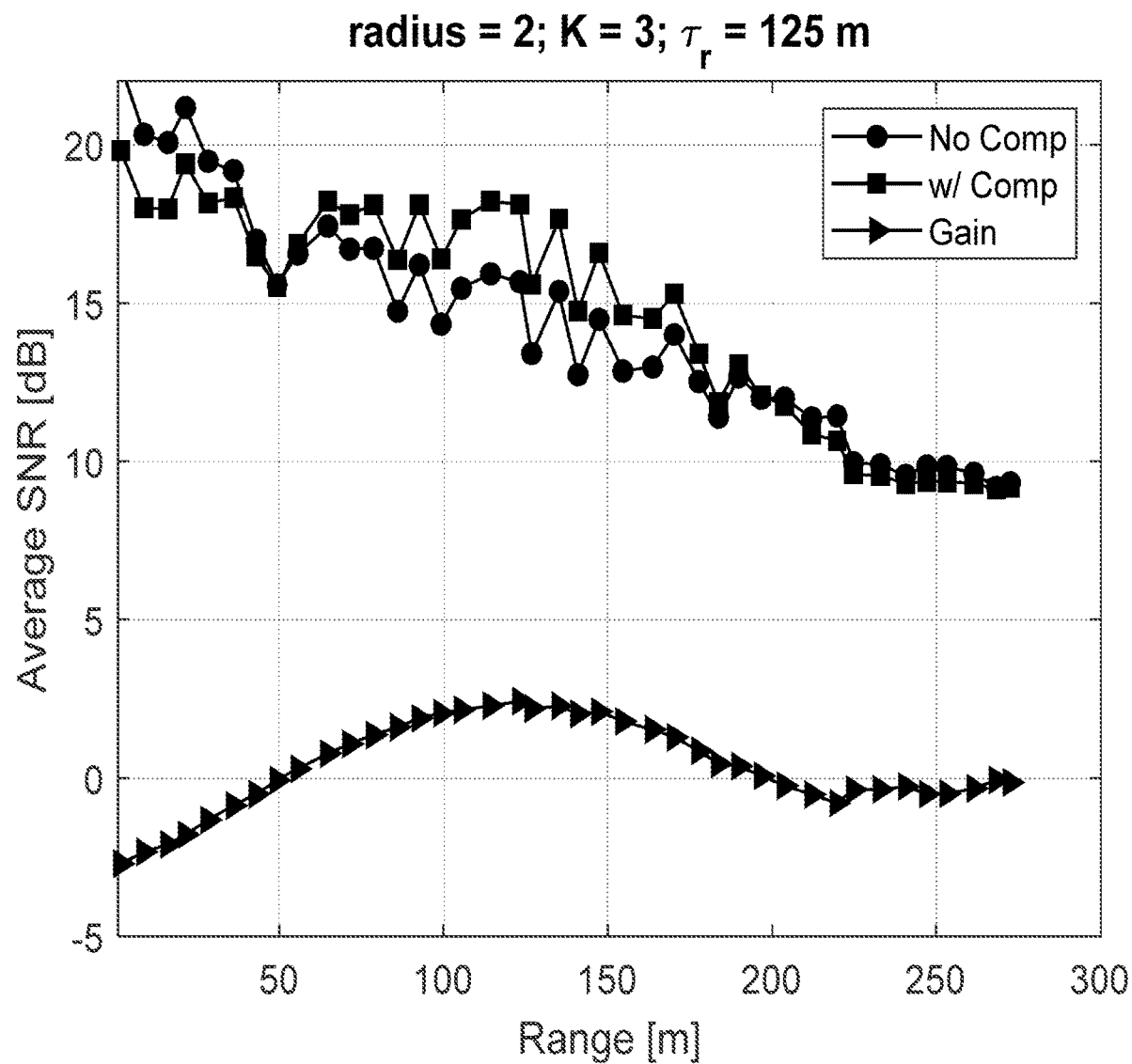
FIG. 11E and FIG. 11F are graphs that illustrates example improvement in signal to noise as a function of range due to digital compensation for frequency broadening at two different choices for the number of Doppler peaks used, according to various implementations.
Figure 11F:
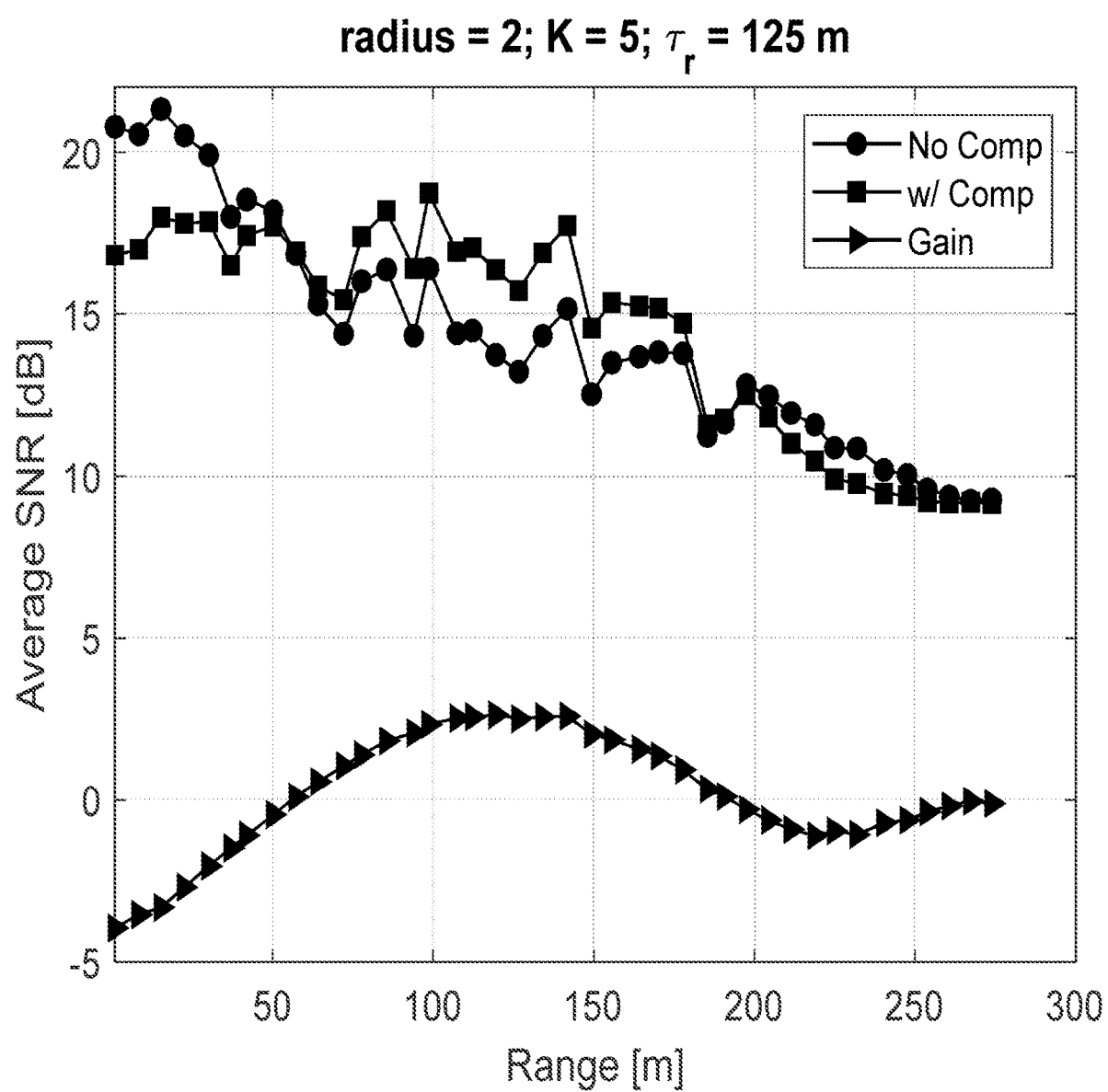

FIG. 11E and FIG. 11F are graphs that illustrates example improvement in signal to noise as a function of range due to digital compensation for frequency broadening at two different choices for the number of Doppler peaks used, according to various implementations. In each plot the horizontal axis indicates range in meters; and, the vertical axis indicates average signal to noise ratio in dB. These figures show the results of applying the speckle compensation to simulated speckle broadened data vs. range for a given choice of compensation radius r, and different numbers K of frequency points for which to compensate. Each trace indicates the SNR as a simulated target is moved from 0 to 275 meters. The trace with closed circles indicates the results with no compensation for coherence broadening. The trace marked with closed squares indicates the results with the compensation for coherence broadening tuned for a $L_r$ corresponding to a 125 m range to target. The trace with closed triangles indicates the gain using the compensation. At the reference distance $L_r$=125 m the gain is the greatest, about 2 dB. Inside of 50 meters there is a loss and beyond 200 meters there is no gain. Comparing FIG. 11E with K=3 and FIG. 11F with K=5, these figures show that the max gain of the speckle processing algorithm increases with the number, K, of Doppler frequency compensations. However, the increased gain also means increased loss when the actual range peak is far away from the reference range $L_r$ assumed in the compensation.

5. Computational Hardware Overview

FIG. 12 is a block diagram that illustrates a computer system 1200 upon which an implementation of the disclosure may be implemented. Computer system 1200 includes a communication mechanism such as a bus 1210 for passing information between other internal and external components of the computer system 1200. Information is represented as physical signals of a measurable phenomenon, typically electric voltages, but including, in other implementations, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some implementations, information called analog data is represented by a near continuum of measurable values within a particular range. Computer system 1200, or a portion thereof, constitutes a means for performing one or more steps of one or more methods described herein.

A sequence of binary digits constitutes digital data that is used to represent a number or code for a character. A bus 1210 includes many parallel conductors of information so that information is transferred quickly among devices coupled to the bus 1210. One or more processors 1202 for processing information are coupled with the bus 1210. A processor 1202 performs a set of operations on information. The set of operations include bringing information in from the bus 1210 and placing information on the bus 1210. The set of operations also typically include comparing two or more units of information, shifting positions of units of information, and combining two or more units of information, such as by addition or multiplication. A sequence of operations to be executed by the processor 1202 constitutes computer instructions.

Computer system 1200 also includes a memory 1204 coupled to bus 1210. The memory 1204, such as a random access memory (RAM) or other dynamic storage device, stores information including computer instructions. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of computer instructions. The computer system 1200 also includes a read only memory (ROM) 1206 or other static storage device coupled to the bus 1210 for storing static information, including instructions, that is not changed by the computer system 1200. Also coupled to bus 1210 is a non-volatile (persistent) storage device 1208, such as a magnetic disk or optical disk, for storing information, including instructions, that persists even when the computer system 1200 is turned off or otherwise loses power.

Information, including instructions, is provided to the bus 1210 for use by the processor from an external input device 1212, such as a keyboard containing alphanumeric keys operated by a human user, or a sensor. A sensor detects conditions in its vicinity and transforms those detections into signals compatible with the signals used to represent information in computer system 1200. Other external devices coupled to bus 1210, used primarily for interacting with humans, include a display device 1214, such as a cathode ray tube (CRT) or a liquid crystal display (LCD), for presenting images, and a pointing device 1216, such as a mouse or a trackball or cursor direction keys, for controlling a position of a small cursor image presented on the display 1214 and issuing commands associated with graphical elements presented on the display 1214.

In the illustrated implementation, special purpose hardware, such as an application specific integrated circuit (IC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some implementations, communications interface 1270 is an integrated services digital network (ISDN) card or a digital subscriber line (DSL) card or a telephone modem that provides an information communication connection to a corresponding type of telephone line. In some implementations, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1270 sends and receives electrical, acoustic or electromagnetic signals, including infrared and optical signals that carry information streams, such as digital data.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1202, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1202, except for carrier waves and other signals.

Logic encoded in one or more tangible media includes one or both of processor instructions on a computer-readable storage media and special purpose hardware, such as ASIC 1220.

Network link 1278 typically provides information communication through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290. A computer called a server 1292 connected to the Internet provides a service in response to information received over the Internet. For example, server 1292 provides information representing video data for presentation at display 1214.

The disclosure is related to the use of computer system 1200 for implementing the techniques described herein. According to one implementation of the disclosure, those techniques are performed by computer system 1200 in response to processor 1202 executing one or more sequences of one or more instructions contained in memory 1204. Such instructions, also called software and program code, may be read into memory 1204 from another computer-readable medium such as storage device 1208. Execution of the sequences of instructions contained in memory 1204 causes processor 1202 to perform the method steps described herein. In alternative implementations, hardware, such as application specific integrated circuit 1220, may be used in place of or in combination with software to implement the disclosure. Thus, implementations of the disclosure are not limited to any specific combination of hardware and software.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server 1292 transmits program code for a particular application, requested by a message sent from computer 1200, through Internet 1290, ISP equipment 1284, local network 1280 and communications interface 1270. The received code may be executed by processor 1202 as it is received, or may be stored in storage device 1208 or other non-volatile storage for later execution, or both. In this manner, computer system 1200 may obtain application program code in the form of a signal on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red a carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

Figure 13:
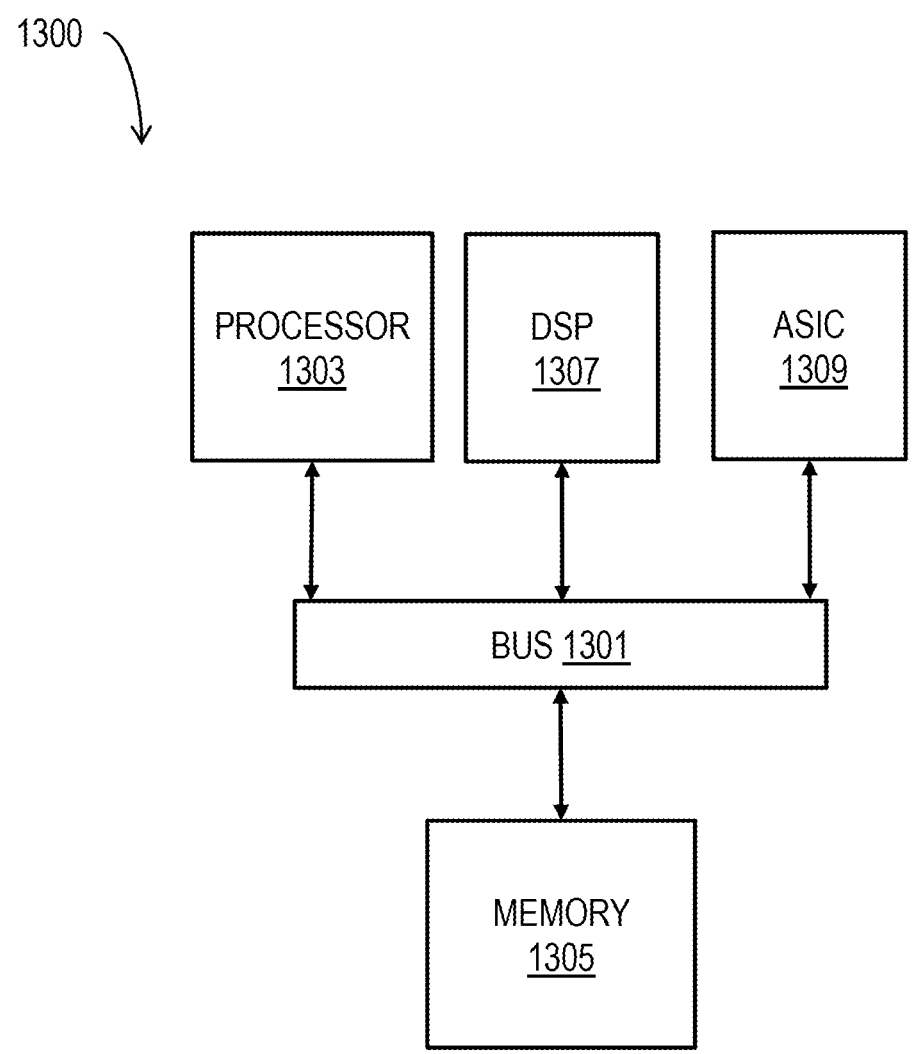
FIG. 13 illustrates a chip set upon which an implementation of the disclosure may be implemented.

FIG. 13 illustrates a chip set 1300 upon which an implementation of the disclosure may be implemented. Chip set 1300 is programmed to perform one or more steps of a method described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain implementations the chip set can be implemented in a single chip. Chip set 1300, or a portion thereof, constitutes a means for performing one or more steps of a method described herein.

In one implementation, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1305 also stores the data associated with or generated by the execution of one or more steps of the methods described herein.

6. Alterations, Extensions and Modifications

The disclosure has been described with reference to specific implementations thereof. It will, however, be evident that various modifications and changes may be made thereto without departing from the broader spirit and scope of the disclosure. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various implementations. Thus, a range from 0 to 10 includes the range 1 to 4 in some implementations.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical Value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some implementations of the disclosure are described below in the context of binary, π/2 (90 degree) phase encoding at a radio frequency modulated onto an optical signal; but, implementations are not limited to this context. In other implementations, other phase encoding is used, with different phase differences (e.g., 30, 60, or 180 degrees) or encoding with 3 or more different phases. Implementations are described in the context of a single optical beam and its return on a single detector or pair of detectors, which in other implementations can then be scanned using any known scanning means, such as linear stepping or rotating optical components or with arrays of transmitters or arrays of detectors or pairs of detectors. For purposes of this description, "phase code duration" is a duration of a code that indicates a sequence of phases for a phase-encoded signal modulated onto an optical signal.

What is claimed is:

1. An autonomous vehicle control system comprising: one or more processors; and one or more computer-readable storage mediums storing instructions which, when executed by the one or more processors, cause the one or more processors to:
receive an electrical signal generated based on a returned optical signal that is reflected from an object;
determine a Doppler frequency shift of the returned optical signal over a first duration of the electrical signal;
generate a corrected electrical signal based on the Doppler frequency shift;
determine a range to the object based on the corrected electrical signal over a second duration that is shorter than the first duration; and
control at least one of a steering system or a braking system based on the range.

2. The autonomous vehicle control system as recited in claim 1, wherein the one or more processors are further configured to:
generate a first optical signal by modulating a code that indicates a sequence of phases for a phase encoded signal with reference to an optical signal; and
transmit the first optical signal to the object.

3. The autonomous vehicle control system as recited in claim 2, wherein the first duration is an integer multiple greater than 1 of a duration of the code.

4. The autonomous vehicle control system as recited in claim 2, wherein the second duration is equal to or substantially equal to a duration of the code.

5. The autonomous vehicle control system as recited in claim 2, wherein the one or more processors are further configured to:
determine the range to the object based on a cross correlation, over the second duration, between the corrected electrical signal and a radio frequency (RF) signal that is associated with the first optical signal.

6. The autonomous vehicle control system as recited in claim 5, wherein the one or more processors are further configured to:
determine the cross correlation, over the second duration, between (i) a first Fourier transform of the RF signal that is associated with the first optical signal and (ii) a second Fourier transform of the corrected electrical signal.

7. The autonomous vehicle control system as recited in claim 1, wherein the one or more processors are further configured to:
determine a spectrum over the first duration of the electrical signal; and
determine the Doppler frequency shift based on the spectrum.

8. The autonomous vehicle control system as recited in claim 1, wherein the spectrum is a cross spectrum of an in-phase component of the electrical signal and a quadrature component of the electrical signal.

9. The autonomous vehicle control system as recited in claim 1, wherein the one or more processors are further configured to:
determine the first duration based on at least one of a speed of a vehicle relative to a surface external to the vehicle, a location of the vehicle relative to the surface external to the vehicle, and a scan angle relative to the surface external to the vehicle.

10. The autonomous vehicle control system as recited in claim 1, wherein the one or more processors are further configured to:
control the at least one of the steering system or the braking system based on the range and a sign of the Doppler frequency shift.

11. The autonomous vehicle as recited in claim 1, wherein the one or more processors are further configured to:
generate a first optical signal by modulating a code that indicates a sequence of phases for a phase encoded signal with reference to an optical signal; and
transmit the first optical signal to the object.

12. The autonomous vehicle as recited in claim 11, wherein the first duration is an integer multiple greater than 1 of a duration of the code.

13. The autonomous vehicle as recited in claim 11, wherein the second duration is equal to or substantially equal to a duration of the code.

14. The autonomous vehicle as recited in claim 11, wherein the one or more processors are further configured to:
determine the range to the object based on a cross correlation, over the second duration, between the corrected electrical signal and a radio frequency (RF) signal that is associated with the first optical signal.

15. The autonomous vehicle as recited in claim 14, wherein the one or more processors are further configured to:
determine the cross correlation, over the second duration, between (i) a first Fourier transform of the RF signal that is associated with the first optical signal and (ii) a second Fourier transform of the corrected electrical signal.

16. A light detection and ranging (LIDAR) system, the LIDAR system comprising:
one or more processors; and one or more computer-readable storage mediums storing instructions which, when executed by the one or more processors, cause the one or more processors to:
receive an electrical signal generated based on a returned optical signal that is reflected from an object;
determine a Doppler frequency shift of the returned optical signal over a first duration of the electrical signal;
generate a corrected electrical signal based on the Doppler frequency shift; and
determine a range to the object based on the corrected electrical signal over a second duration that is shorter than the first duration.

17. An autonomous vehicle comprising:
at least one of a steering system or a braking system; and
a vehicle controller comprising one or more processors configured to:
receive an electrical signal generated based on a returned optical signal that is reflected from an object;
determine a Doppler frequency shift of the returned optical signal over a first duration of the electrical signal;
generate a corrected electrical signal based on the Doppler frequency shift;
determine a range to the object based on the corrected electrical signal over a second duration that is shorter than the first duration; and
control the at least one of the steering system or the braking system based on the range.

18. The autonomous vehicle as recited in claim 17, wherein the one or more processors are further configured to:
determine a spectrum over the first duration of the electrical signal; and
determine the Doppler frequency shift based on the spectrum.

19. The autonomous vehicle as recited in claim 17, wherein the one or more processors are further configured to: determine the first duration based on at least one of a speed of a vehicle relative to a surface external to the vehicle, a location of the vehicle relative to the surface external to the vehicle, and a scan angle relative to the surface external to the vehicle.

20. The autonomous vehicle as recited in claim 17, wherein the one or more processors are further configured to:
control the at least one of the steering system or the braking system based on the range and a sign of the Doppler frequency shift.

* * * * *